US012776632B2

(12) United States Patent
Beristany et al.

(10) Patent No.: US 12,776,632 B2
(45) Date of Patent: Oct. 27, 2026

(54) WEATHERPROOF BOX WITH INTEGRATED FITTING

(71) Applicant: Hubbell Incorporated, Shelton, CT (US)

(72) Inventors: Victor Beristany, South Bend, IN (US); Krzysztof Wojciech Korcz, Granger, IN (US)

(73) Assignee: Hubbell Incorporated, Shelton, CT (US)

( * ) Notice: Subject to any disclaimer, the term of this patent is extended or adjusted under 35 U.S.C. 154(b) by 101 days.

(21) Appl. No.: 18/685,124

(22) PCT Filed: Aug. 22, 2022

(86) PCT No.: PCT/US2022/041070
§ 371 (c)(1),
(2) Date: Feb. 20, 2024

(87) PCT Pub. No.: WO2023/028001
PCT Pub. Date: Mar. 2, 2023

(65) Prior Publication Data

US 2024/0364086 A1 Oct. 31, 2024

Related U.S. Application Data

(60) Provisional application No. 63/270,128, filed on Oct. 21, 2021, provisional application No. 63/236,139, filed on Aug. 23, 2021.

(51) Int. Cl.
*H02G 3/08* (2006.01)
*H02G 3/06* (2006.01)

(52) U.S. Cl.
CPC .......... *H02G 3/088* (2013.01); *H02G 3/0616* (2013.01)

(58) Field of Classification Search
CPC .......... H02G 3/08; H02G 3/081; H02G 3/088; H02G 3/0616; H02G 3/083; H02G 3/086; H02G 3/22; H05K 5/00; H05K 5/02; F16L 37/0915; F16L 35/00; F16L 37/00
USPC ........ 174/480, 481, 50, 53, 57; 220/3.2–3.9, 220/4.02; 248/906
See application file for complete search history.

(56) References Cited

U.S. PATENT DOCUMENTS 1,822,056 A 9/1931 Noble
4,181,329 A 1/1980 Helm
4,265,265 A 5/1981 Wallace et al.
4,265,365 A 5/1981 Boteler
(Continued)

FOREIGN PATENT DOCUMENTS

CN 87105702 8/1988
CN 1555469 12/2004
(Continued)

OTHER PUBLICATIONS

Mighty-Seal Brochure, Bridgeport Fittings Inc., Apr. 2013. (4 pages).
(Continued)

*Primary Examiner* — Angel R Estrada
(74) *Attorney, Agent, or Firm* — Wissing Miller LLP

(57) ABSTRACT

An electrical box includes an integral conduit receiving port and a weatherproof conduit retention assembly provided in the conduit receiving port. The conduit retention assembly includes a conduit gripping member and a conduit release member.

25 Claims, 19 Drawing Sheets

(56) References Cited

U.S. PATENT DOCUMENTS

| | | | | |
|---|---|---|---|---|
| 5,051,541 | A * | 9/1991 | Bawa | H02G 3/0675 285/151.1 |
| 5,487,572 | A * | 1/1996 | Combot-Courrau | F16L 37/0915 285/308 |
| 5,911,443 | A * | 6/1999 | Le Quere | F16L 37/0915 285/379 |
| 6,499,771 | B1 | 12/2002 | Snyder, Sr. et al. | |
| 6,992,252 | B1 | 1/2006 | Rao et al. | |
| 7,841,630 | B1 | 11/2010 | Auray et al. | |
| 8,158,884 | B2 | 4/2012 | de la Borbolla | |
| 8,322,755 | B2 * | 12/2012 | Kluss | F16L 37/0915 285/314 |
| 8,398,122 | B2 | 3/2013 | Crompton et al. | |
| 8,474,877 | B2 | 7/2013 | Smith | |
| 8,480,134 | B2 | 7/2013 | Crompton et al. | |
| 8,487,197 | B2 * | 7/2013 | Smith | H02G 3/0691 439/271 |
| 8,844,981 | B1 * | 9/2014 | Crompton | F16L 37/0915 285/315 |
| 9,068,680 | B1 * | 6/2015 | Crompton | F16L 37/091 |
| 9,086,179 | B1 | 7/2015 | Komolrochanaporn | |
| 10,044,177 | B2 | 8/2018 | Thomas et al. | |
| 11,035,510 | B1 | 6/2021 | Crompton et al. | |
| 11,105,452 | B1 | 8/2021 | Dias et al. | |
| 2005/0194785 | A1 | 9/2005 | Shemtov | |
| 2011/0309611 | A1 | 12/2011 | Smith | |
| 2012/0284994 | A1 | 11/2012 | Crompton et al. | |
| 2014/0117660 | A1 | 5/2014 | Smith | |
| 2015/0263498 | A1 | 9/2015 | Thomas et al. | |
| 2016/0025253 | A1 | 1/2016 | Crompton | |
| 2016/0126716 | A1 | 5/2016 | Crompton et al. | |
| 2016/0273695 | A1 | 9/2016 | Bobo et al. | |
| 2017/0331264 | A1 | 11/2017 | Yeh | |
| 2018/0013274 | A1 | 1/2018 | Yang | |
| 2023/0341071 | A1 | 10/2023 | Fardon et al. | |

FOREIGN PATENT DOCUMENTS

| | | |
|---|---|---|
| EP | 1146275 | 10/2001 |
| WO | 2005114031 A3 | 5/2006 |

OTHER PUBLICATIONS

Product Sales Webpage, "Orbit 1 inch PVC-Lock Coupling", http://www.homedepot.com/p/Orbit-1-in-PVC-Lock-Coupling-38676/203266795, May 19, 2015. (2 pages).

International Search Report and Written Opinion in corresponding International Application No. PCT/US2022/041070 mailed Dec. 5, 2022. (9 pages).

International Preliminary Report on Patentability in corresponding International Application No. PCT/US2022/041070 mailed Mar. 7, 2024. (8 pages).

* cited by examiner

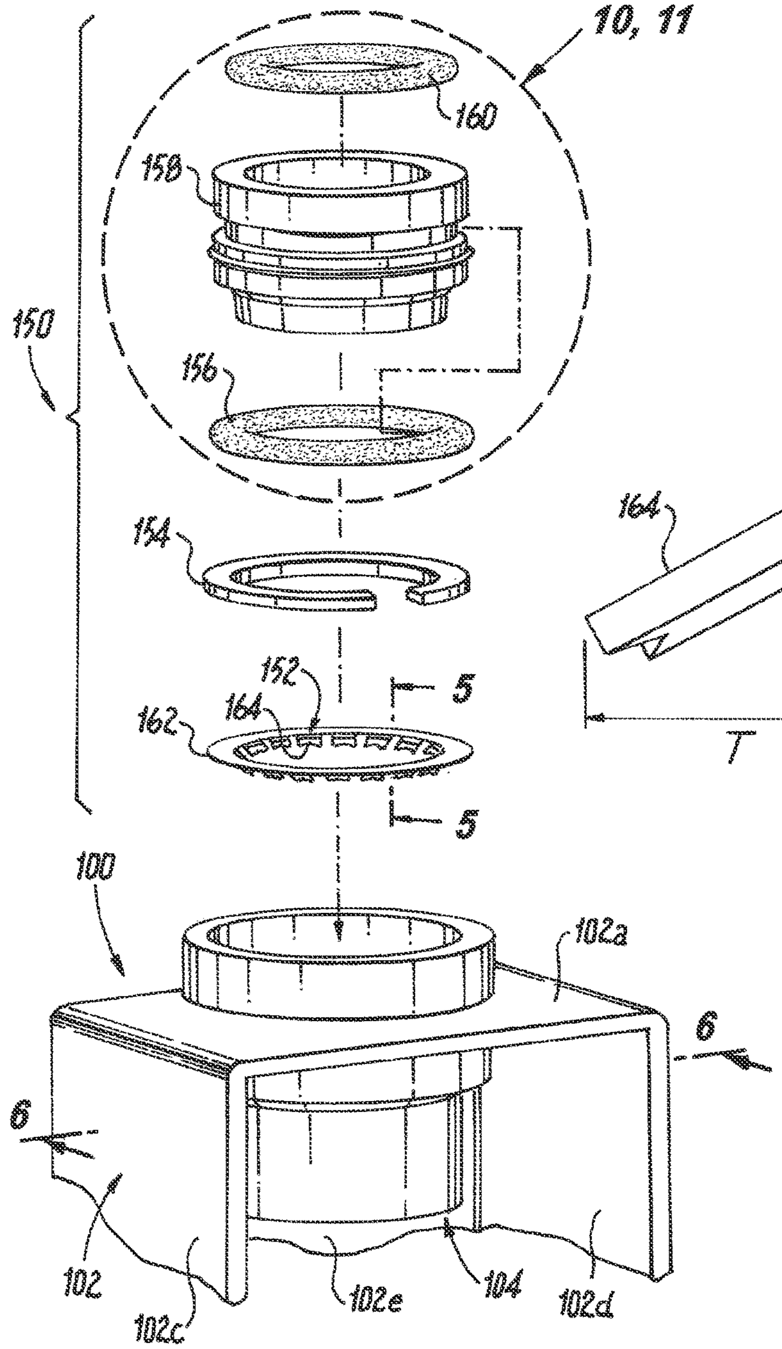
Fig. 4
Fig. 5
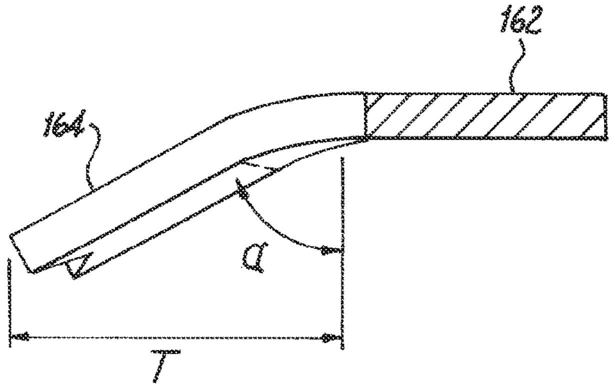

Fig. 12
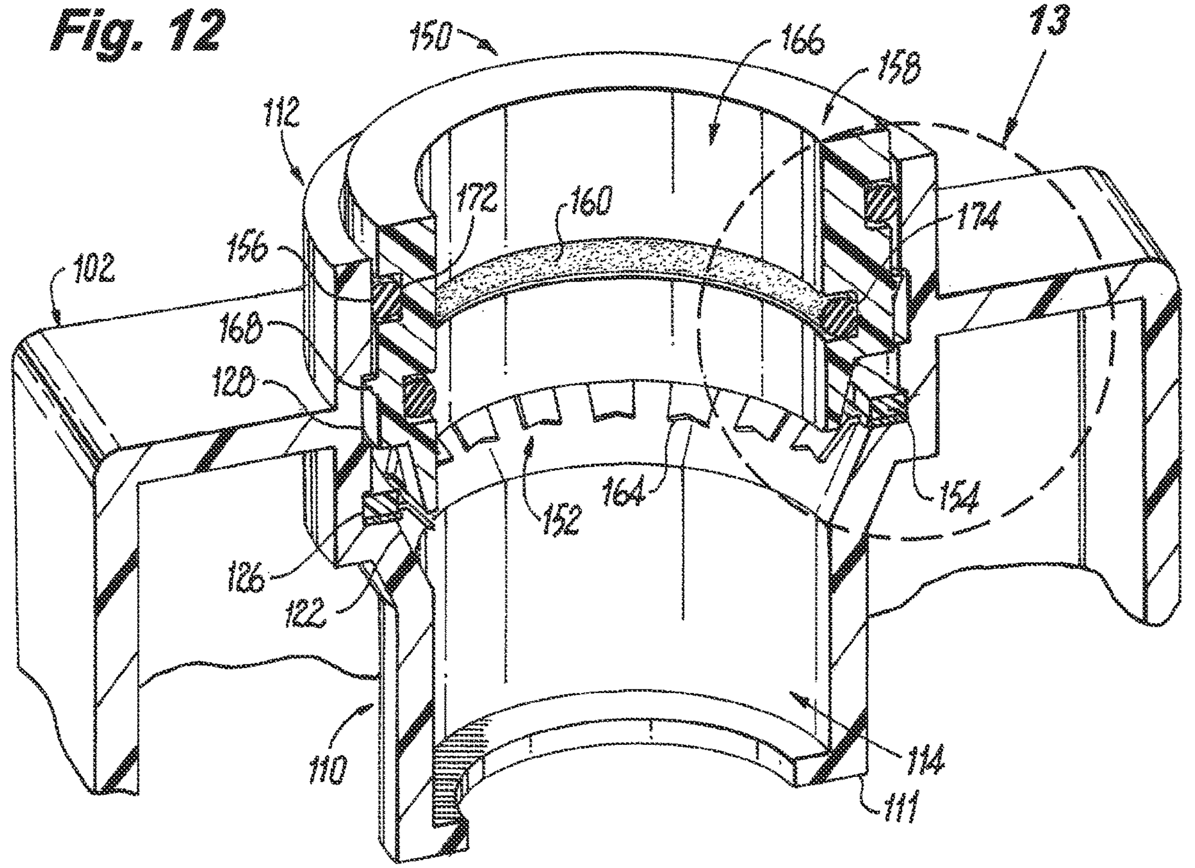
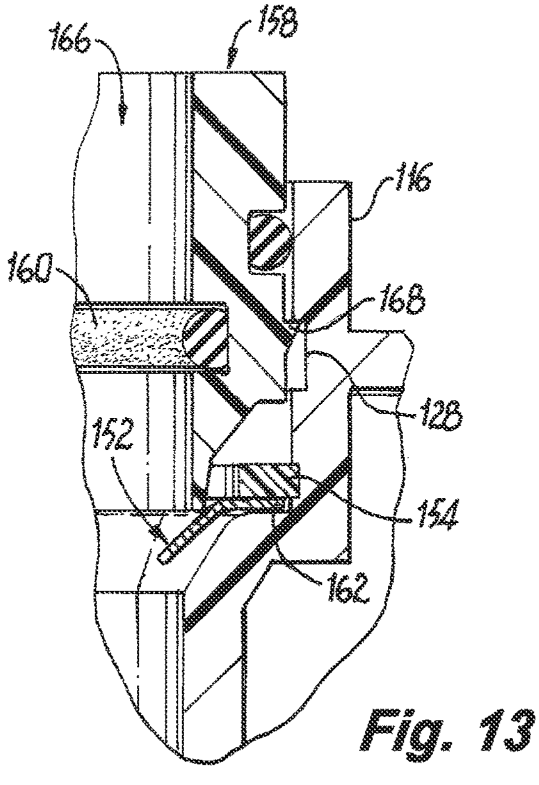
Fig. 13
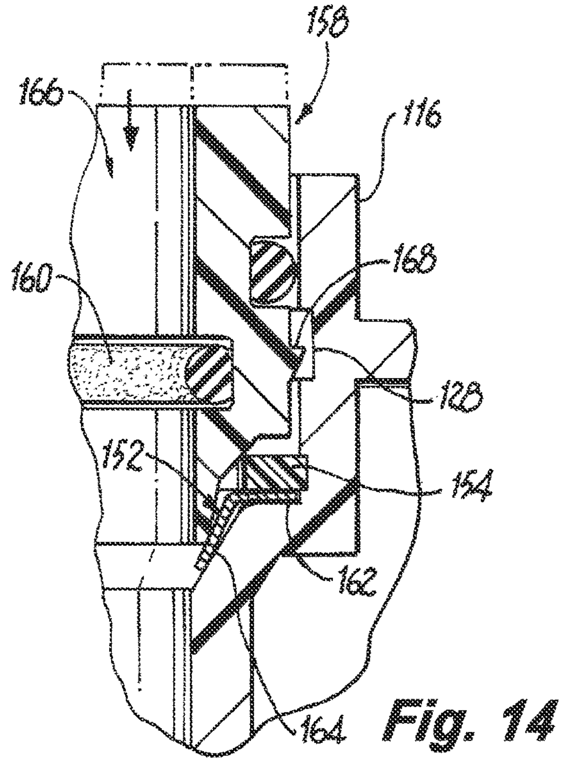
Fig. 14

Fig. 30
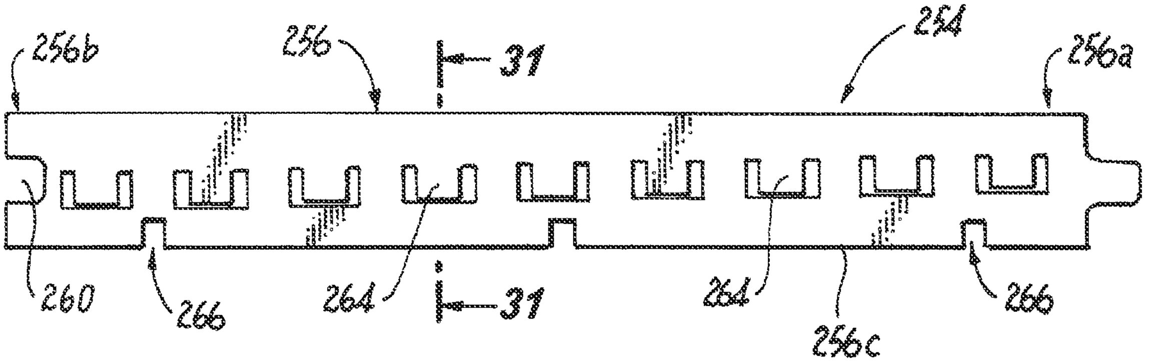
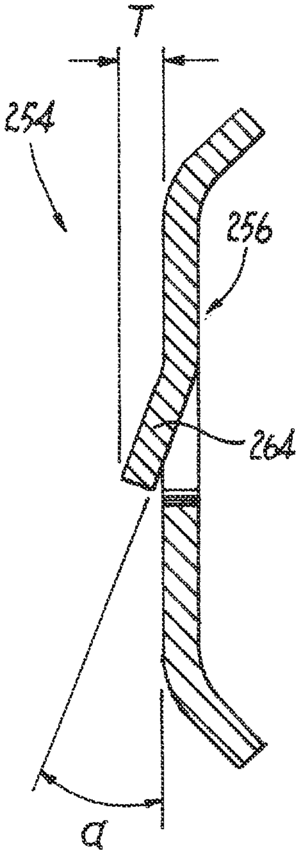
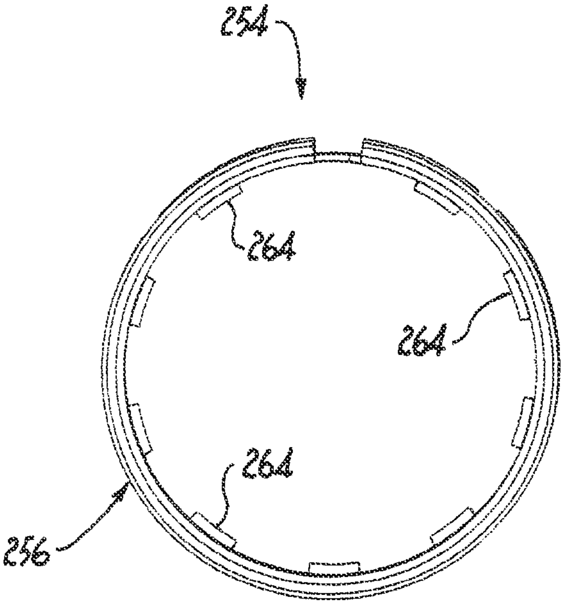
Fig. 32
Fig. 31

WEATHERPROOF BOX WITH INTEGRATED FITTING

CROSS-REFERENCE TO RELATED APPLICATIONS

This application is a 371 of PCT/US2022/041070 filed on Aug. 22, 2022, published on Mar. 2, 2023 under publication number WO 2023/028001 A1, which claims priority benefits from U.S. Provisional Application No. 63/270,128 filed on Oct. 21, 2021 and from U.S. Provisional Application No. 63/236,139 filed on Aug. 23, 2021, the contents of each are incorporated herein in their entirety by reference.

BACKGROUND

Field

The present disclosure relates generally to electrical boxes, and more particularly to push-to-connect weatherproof electrical boxes with integrated fittings.

Description of the Related Art

Commercial and residential buildings often use common electrical components such as electrical outlets and ground fault circuit interrupter (GFCI) outlets for connecting to a 120 v, 240 v or similar wiring in a building. These components are often enclosed in electrical boxes mounted in walls, floors and ceilings. In certain applications including, for example, outdoor applications, it is also desirable to use weatherproof electrical boxes. It is often desirable to provide weatherproof electrical boxes capable of receiving electrical wire conduit such as electrical metallic tubing (EMT), Rigid or polyvinyl chloride (PVC) conduit.

Conduit fittings are generally separate devices that are mounted in a standard casting knockout hole in an electrical box. For example, a standard electrical box may have a simple knockout or plug in an opening that may be removed. A traditional conduit fitting would be a separate device that has a mechanism such as a threaded nut and washer for securing the conduit fitting in the electrical box. Installing a separate conduit fitting in an electrical box such as by using a nut and washer increase labor costs and requires additional logistics for additional parts and tools for installation.

SUMMARY

The present disclosure relates to an electrical box including one or more integral conduit receiving ports and a conduit retention assembly secured within each conduit receiving port. The present disclosure also relates to conduit retention assemblies used to secure conduits to electrical boxes and to release conduits from the electrical boxes.

In one exemplary embodiment, the electrical box is a weatherproof electrical box that includes at least one integral conduit receiving port and a conduit retention assembly secured within the at least one conduit receiving port. Each conduit retention assembly includes one or more sealing members that engage the conduit receiving port and that contact a conduit inserted into the conduit receiving port to create a sealed fit to limit and possible prevent moisture from entering the electrical box.

In another exemplary embodiment, the electrical box includes at least one conduit receiving port and at least one conduit retention assembly. The conduit receiving port has a retention assembly opening. The conduit retention assembly is positioned in the retention assembly opening and includes one or more conduit gripping members, a retainer member positioned adjacent the conduit gripping member to hold the conduit gripping member within the conduit receiving port and a conduit release member movably secured within the conduit receiving port and configured and dimensioned to move between a gripping position and a release position.

In another exemplary embodiment, the electrical box includes at least one conduit receiving port and at least one conduit retention assembly. The at least one conduit receiving port has an inner surface and a conduit receiving opening. The at least one conduit retention assembly is positioned in the conduit receiving opening and includes at least one seal member, e.g., an O-ring, and at least one conduit gripping member. The at least one conduit gripping member includes a ring member having a hollow central portion and a plurality of conduit grippers, e.g., teeth, spaced apart around a perimeter of the ring member. Each of the plurality of conduit grippers extending into the hollow central portion a predefined distance. In another exemplary embodiment, the at least one conduit retention assembly includes a seal member, e.g., an O-ring, and a conduit gripping member. The conduit gripping member includes a ring member having a hollow central portion and a plurality of conduit grippers, e.g., teeth, spaced apart around a perimeter of the ring member. Each of the plurality of conduit grippers extending into the hollow central portion a predefined distance and/or at an angle relative to the ring member.

BRIEF DESCRIPTION OF THE DRAWINGS

The accompanying drawings illustrate presently preferred embodiments of the present disclosure, and together with the general description given above and the detailed description given below, serve to explain principles of the disclosure. As shown throughout the drawings, like reference numerals designate like or corresponding parts.

FIG. 4 is an exploded perspective view of the electrical box of FIG. 1 without the electrical conduit, illustrating components of an exemplary embodiment of a retention assembly secured within the top conduit receiving port of the electrical box;

FIG. 5 is a cross-sectional view of a ring member of the retention assembly of FIG. 4 taken along line 5-5;

FIG. 12 is a top perspective view in cross-section of the electrical box of FIG. 3 taken from detail 12 and illustrating the retention assembly positioned within the conduit receiving port;

FIG. 13 is an enlarged perspective view of the electrical box and retention assembly of FIG. 12 taken from detail 13, illustrating the release member of the retention assembly in a gripping position where teeth of a conduit gripping member of the retention assembly can grip a conduit in the conduit receiving port of the electrical box;

FIG. 14 is the enlarged perspective view of the electrical box and retention assembly of FIG. 13, illustrating the release member of the retention assembly in a release position where the teeth of the conduit gripping member are flexed by the release member to release a conduit from the conduit receiving port;

FIG. 30 is a plan view of an exemplary embodiment of a conduit gripping member according to the present disclosure while the conduit gripping member is flat and prior to forming into a circular ring;

FIG. 31 is a cross-sectional view of the conduit gripping member of FIG. 30 taken along line 31-31 and illustrating teeth or prongs of the conduit gripping member;

FIG. 32 is a top plan view of the conduit gripping member of FIG. 30 after being formed into a circular ring;

DETAILED DESCRIPTION

The present disclosure describes exemplary embodiments of electrical boxes, e.g., weatherproof electrical boxes, having one or more conduit receiving ports that include integral or built-in push-fit type conduit retention assemblies that can be configured to accept multiple electrical conduit sizes, and that include an integral or built-in conduit release member. In some embodiments, the push-fit type retention assemblies may be configured to receive different diameter conduits, such as ½ inch conduits and ¾ inch conduits. The push-fit type retention assemblies according to the present disclosure may be configured to receive different types of conduits, such as PVC conduits, EMT conduits and Rigid conduits, having substantially the same or similar outer diameters. For example, the outer diameter of ½ inch PVC conduits and Rigid conduits are similar and the push-fit type retention assemblies may be configured to receive such ½ inch conduit types. The electrical boxes are capable of accepting electrical wiring devices such as switches, receptacles, circuit interrupting receptacles, light fixtures and other electrical devices, and the push-fit conduit retention assemblies reduce installation labor when compared to the installation of electrical boxes with traditional connector fittings. The electrical boxes shown herein are weatherproof electrical boxes. The electrical boxes may also be referred to herein as the "boxes" in the plural and the "box" in the singular. The push-fit type conduit retention assemblies may also be referred to herein as the "retention assemblies" in the plural and the "retention assembly" in the singular. The electrical conduit may also be referred to herein as the "conduits" in the plural and the "conduit" in the singular.

Figure 1:
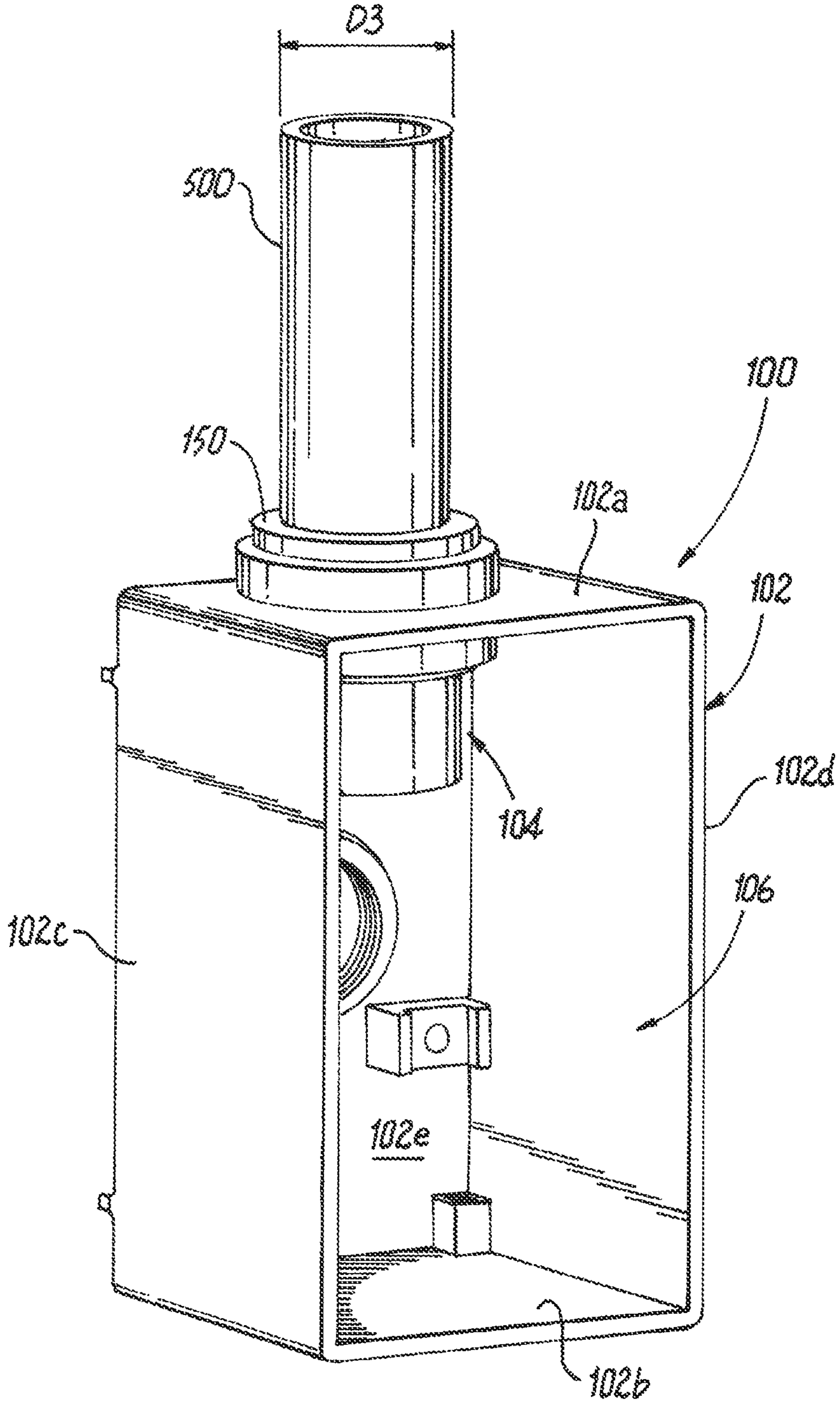
FIG. 1 is a perspective view of an exemplary embodiment of an electrical box according to the present disclosure, illustrating an electrical conduit secured within a conduit receiving port using a retention assembly positioned within the conduit receiving port.
Figure 23:
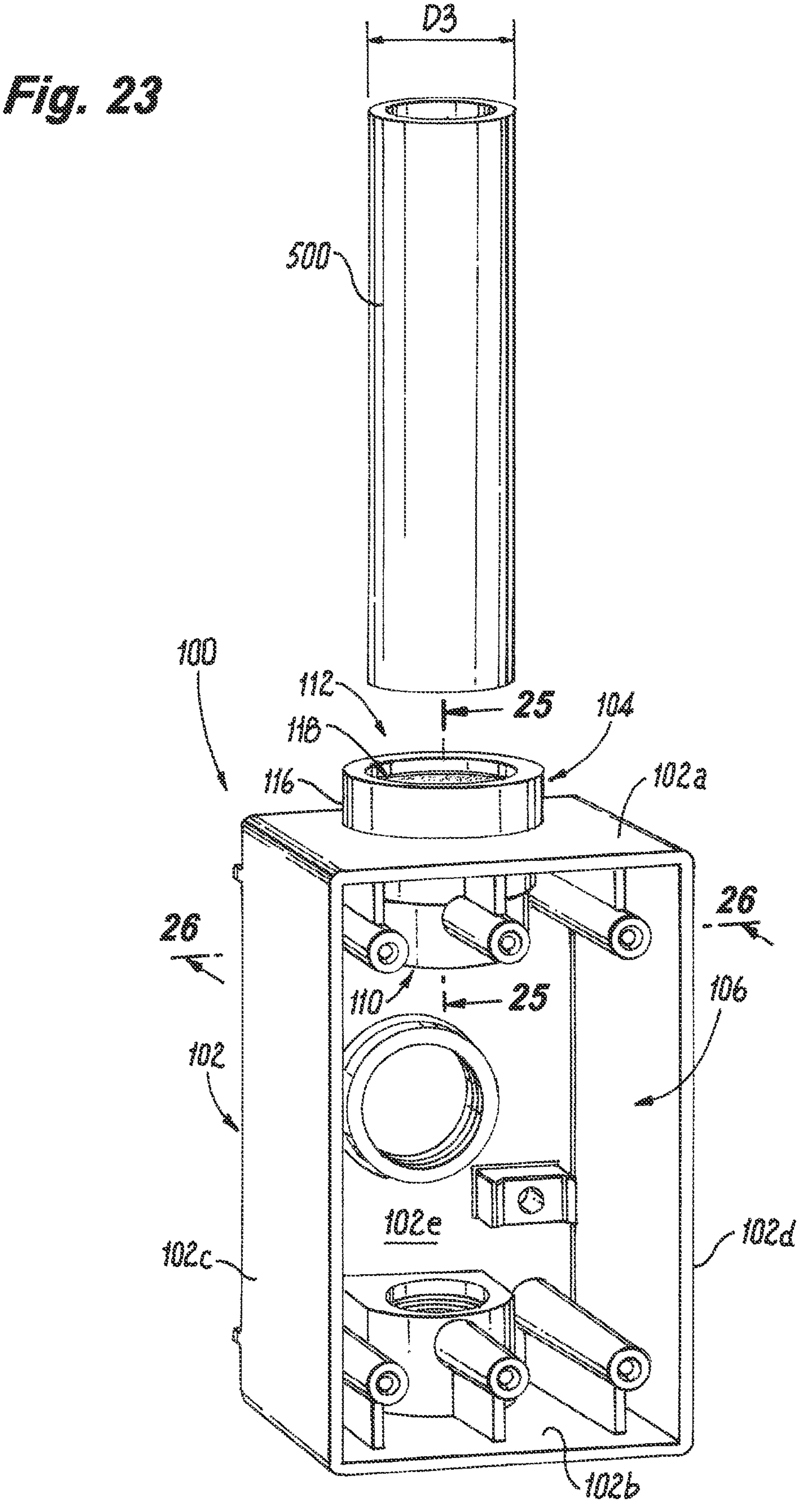
FIG. 23 is a perspective view of another exemplary embodiment of an electrical box according to the present disclosure, illustrating an electrical conduit positioned to be secured within a conduit receiving port using another exemplary embodiment of a retention assembly positioned within the conduit receiving port.

Referring now to FIG. 1, an exemplary embodiment of a box 100 with a conduit 500 attached thereto is shown. The box 100 may be a single gang box or the box may be a multi-gang box, such as a two gang box or a three gang box. The box 100 may be plastic, e.g., a PVC box or a metallic box. In the exemplary embodiment shown, the box 100 is a single gang plastic box that includes a housing 102 and one or more hubs or conduit receiving ports 104. The housing 102 has a top wall 102*a*, a bottom wall 102*b*, a first side wall 102*c*, a second side wall 102*d* and a rear wall 102*e* that define a device opening 106 that houses an electrical wiring device. The one or more conduit receiving ports 104 are preferably integral with or monolithically formed into the housing 102. In other embodiments, the one or more conduit receiving ports 104 may be secured to the housing 102 by, for example, welds or threaded connections. The box 100 may also include one or more supports, seen in FIG. 23, used when attaching an electrical wiring device and/or a faceplate, e.g., a cover, to the housing 102. The supports may be integrally or monolithically formed into the housing 102 within the device opening 106 of the box 100 at suitable positions. In other embodiments, the supports may be secured to the housing 102 within the device opening 106. Each support may include an opening that is capable of receiving a fastener, for example a set screw, used to secure an electrical device and/or faceplate to the housing 102.

Figure 2:
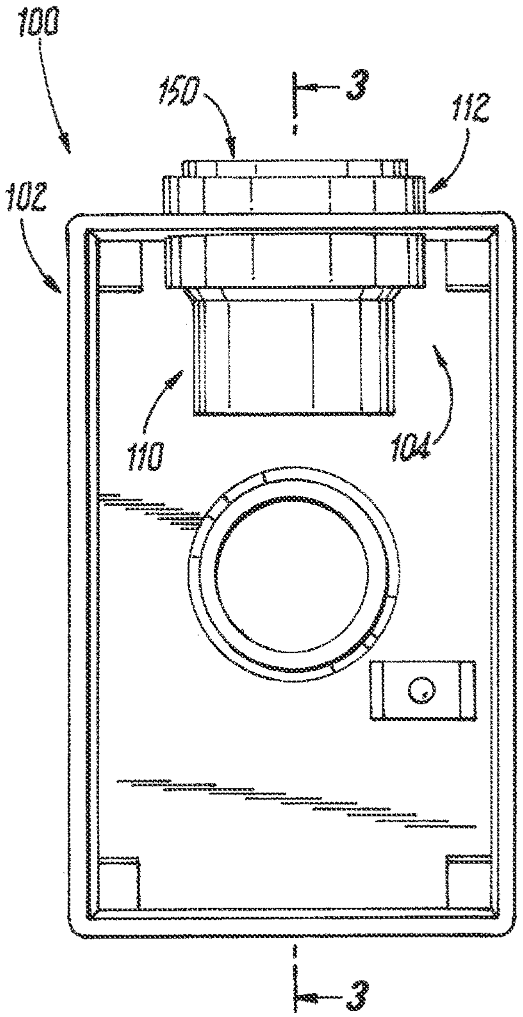
FIG. 2 is a front elevation view of the electrical box of FIG. 1, illustrating a top conduit receiving port.
Figure 3:
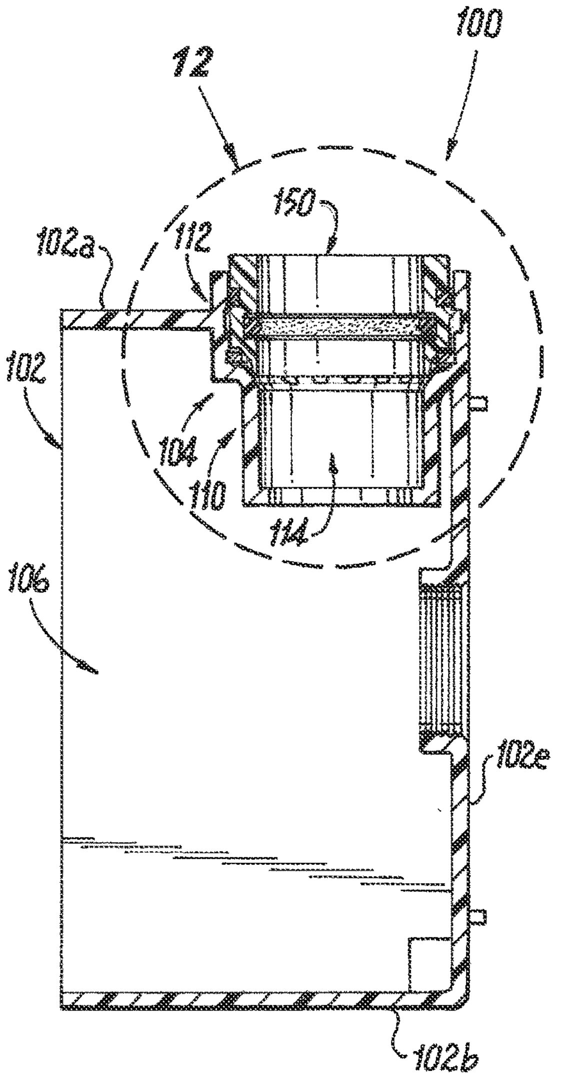
FIG. 3 is a cross-sectional view of the electrical box of FIG. 2 taken along line 3-3.
Figure 6:
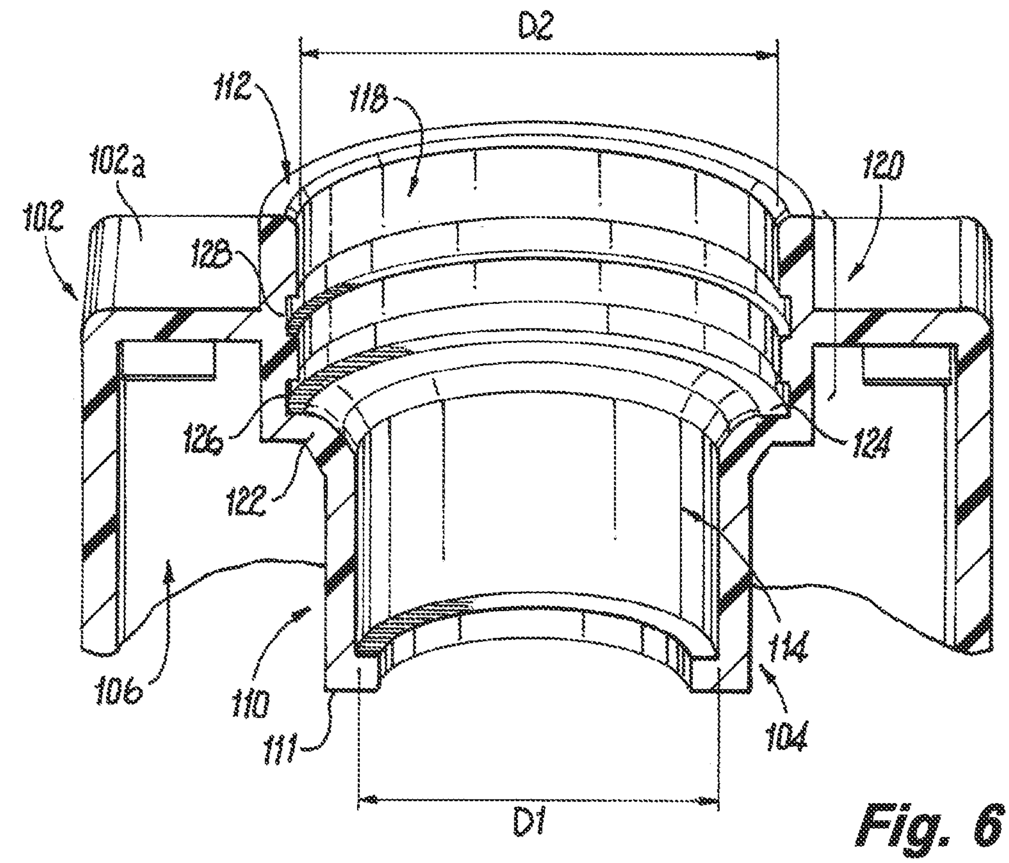
FIG. 6 is an enlarged top cross-section perspective view of a portion of the electrical box of FIG. 4 taken from line 6-6 and illustrating the interior of the conduit receiving port of the electrical box.
Figure 7:
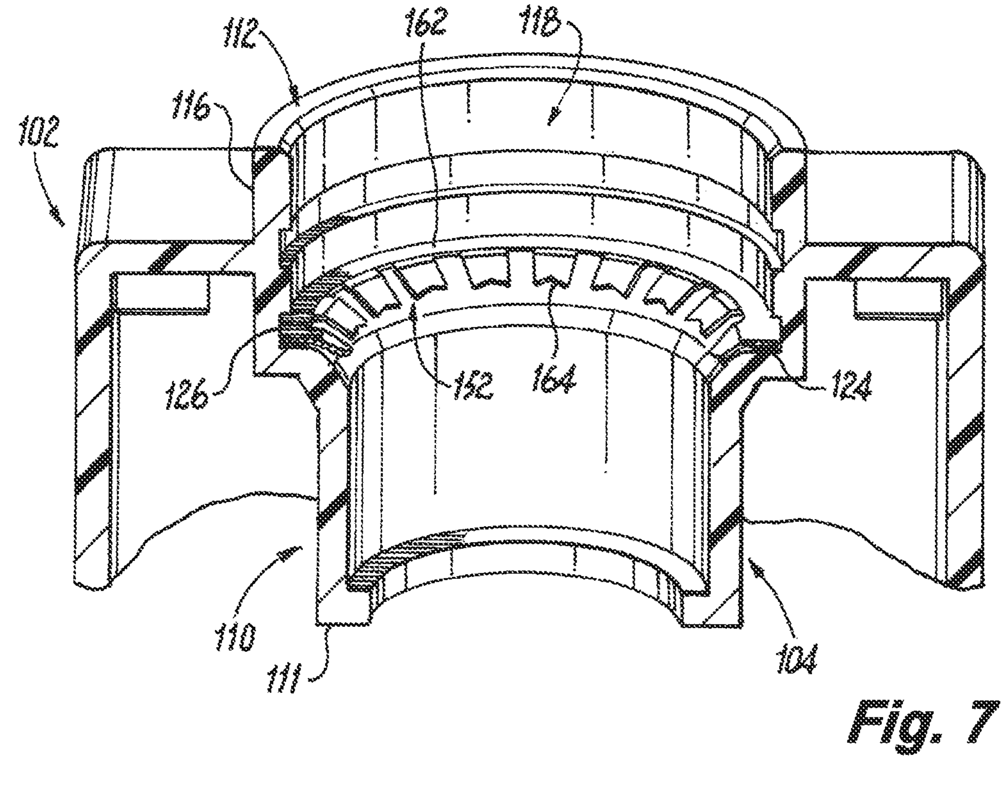
FIG. 7 is the enlarged cross-section view of the conduit receiving port of FIG. 6, illustrating a conduit gripping member of the retention assembly positioned within the conduit receiving port.

In the exemplary embodiment depicted in FIGS. 1-11, the box 100 includes a single conduit receiving port 104 on or extending from the top wall 102*a* of the housing 102, as seen in FIG. 2. However, the box 100 may include additional conduit receiving ports 104 such as a conduit receiving port 104 located on or extending from the bottom wall 102*b* of the housing 102. The present disclosure contemplates any other configuration of conduit receiving ports 104 that may be provided on the housing 102 allowing an electrician or other installer to select a box 100 suitable for a particular application. Each conduit receiving port 104 includes a lower portion 110 and an upper portion 112, seen in FIGS. 2 and 3. As shown in FIGS. 1 and 6, the lower portion 110 includes a chamber 114 configured and dimensioned to receive a conduit 500, seen in FIG. 1, and an edge 111 forming a lip used as a stop to prevent the conduit 500 from being inserted into the device opening 106. In a non-limiting example, the chamber 114 has a circular in cross-section having an inner diameter "D1" in the range of, for example, about 0.688 inches and about 1.250 inches. The upper portion 112 of the conduit receiving port 104 includes a circular wall 116 defining a conduit receiving opening 118 that extends to the chamber 114 of the lower portion 110. At least a portion of the upper portion 112 of the conduit receiving port 104 is configured, dimensioned and shaped to receive a retention assembly 150, seen in FIG. 4. The portion of the upper portion 112 configured, dimensioned and shaped to receive the retention assembly 150 may also be referred to herein as the assembly receiving area 120 of the conduit receiving port 104. The assembly receiving area 120 is in communication with the chamber 114 and the device opening 106, as shown in FIG. 6. In this exemplary embodiment, the assembly receiving area 120 includes at least a portion of the circular wall 116, a tapered surface area 122 and a lip 124 adjacent the tapered surface area 122. A diameter "D2," seen in FIG. 6, of the conduit receiving opening 118 and thus the assembly receiving area 120 of the upper portion 112 of the conduit receiving port 104 is configured, dimensioned and shaped to receive the retention assembly 150, seen in FIGS. 1 and 4. The lip 124 of the assembly receiving area 120 is provided as a rest for a conduit gripping member 152 of the retention assembly 150, as seen in FIGS. 6 and 7. The assembly receiving area 120 is in communication with the chamber 114 and the device opening 106, as shown in FIG. 6. The wall 116 of the upper portion 112 includes a retainer member groove 126 configured and dimensioned to receive the retainer member of the retention assembly 150 described below. The wall 116 of the upper portion 112 also includes a release member groove 128 configured and dimensioned to receive a rib of a release member of the retention assembly 150 described below.

Referring to FIG. 4, the components of the retention assembly 150 are shown removed from their particular spaces in the assembly receiving area 120 of the conduit receiving port 104. In the exemplary embodiment shown, the retention assembly 150 includes one or more conduit gripping members 152, a retainer member 154, an outer seal member 156, a release member 158 and an inner seal member 160. The retention assembly 150 is secured within the assembly receiving area 120 of the conduit receiving opening 118, seen in FIG. 6, in the conduit receiving port 104 using, for example, a friction fit, adhesives, mechanical fasteners and/or welds. The retention assembly 150 may be capable of receiving various outer diameter conduits 500, seen in FIG. 1. As a non-limiting example, the conduit 500 may be a ¾ inch conduit with an outer diameter "D3" of about 1.125 inches, or conduit 500 may be a ½ inch conduit with an outer diameter "D3" of about 0.875 inches, or the conduit 500 may be a 1 inch conduit with an outer diameter "D3" of about 1.375 inches. In such an example, the conduits may be PVC type conduits, EMT type conduits and/or Rigid type conduits. In other embodiments, the retention assembly 150 may be capable of receiving different conduit types of the same size. As non-limiting examples, the retention assembly 150 may be capable of receiving PVC type conduits, EMT type conduits and/or Rigid conduits of the same size, e.g., ½ inch. Similarly, the retention assembly 150 may be capable of receiving PVC type conduits, EMT type conduits and/or Rigid conduits of the same size, e.g., ¾ inch. In other embodiments, the retention assembly 150 may be capable of receiving the same conduit type of different sizes. As non-limiting examples, the retention assembly 150 may be capable of receiving PVC type conduits of different sizes, e.g., ½ inch, ¾ inch or 1 inch PVC conduit. Similarly, the retention assembly 150 may be capable of receiving EMT type conduits of the same size, e.g., ½ inch, ¾ inch or 1 inch EMT conduit. Similarly, the retention assembly 150 may be capable of receiving Rigid type conduits of the same size, e.g., ½ inch, ¾ inch or 1 inch Rigid conduit.

In the exemplary embodiment of FIGS. 4-7, the one or more conduit gripping members 152 includes a ring member 162 with a hollow central portion. The ring member 162 is configured to rest on the lip 124 of the assembly receiving area 120 of the upper portion 112 of the conduit receiving port 104, as seen in FIG. 7. The hollow central portion of the conduit gripping member 152 is configured and dimensioned to receive the desired diameter of conduit 500. Each conduit gripping member 152 is formed from a rigid material, such as steel. Preferably, each conduit gripping member 152 is formed from spring steel such as, for example, 1050 annealed spring steel that may be zinc plated. In the exemplary embodiment shown in FIGS. 5 and 7, the conduit gripping member 152 is a spring-like structure that includes one or more conduit grippers 164. In the embodiment of FIG. 4, multiple conduit grippers 164 are shown. However, the present disclosure contemplates that a single conduit gripper 164 may be used. The single conduit gripper 164 may have a width that is wider that the conduit grippers shown in FIG. 4. The width of the single conduit gripper 164 should be sufficient to engaging and holding conduits 500 within the conduit receiving port 104 when installed. In the embodiment shown, the one or more conduit grippers 164 are teeth or prongs extending from the ring member 162 toward the hollow central portion and angled relative to the ring member 162. Preferably, the one or more teeth or prongs 164 are positioned around the ring member 162 and spaced apart. The spacing between the one or more teeth or prongs 164 is preferably in the range of about 0.125 inches and about 0.250 inches. The one or more teeth or prongs 164 are used for engaging and holding conduits 500 within the conduit receiving port 104 when installed. With reference to FIGS. 4 and 5, the length of each tooth 164 is configured so that each tooth 164 when spaced around the ring member 162 extends into the hollow central portion a distance "T" so that each tooth 164 can engage the desired outer diameter of the conduit to grip the conduit and hold or lock the conduit, e.g., conduit 500, to prevent withdrawal of the conduit from the retention assembly 150. As a non-limiting example, to engage ½ inch PVC conduit, the distance each tooth 164 extends into the hollow central portion may be in the range from about 0.050 inches to about 0.312 inches. As another non-limiting example, to engage ¾ inch Rigid conduit, the distance each tooth 164 extends into the hollow central portion may be in the range from about 0.050 inches to about 0.312 inches. As another non-limiting example, to engage 1 inch EMT conduit, the distance each tooth 164 extends into the hollow central portion may be in the range from about 0.050 inches to about 0.312 inches. A free end of each tooth or prong 164 may have a flat end or tip, a single pointed end or tip or a multi-pointed end or tip. In the exemplary embodiment shown, the free end of each tooth or prong 164 is a multi-pointed end or tip. As noted, the teeth or prongs 164 extend inwardly toward the hollow central portion of the ring member 162 and downwardly or at an angle "a" relative to the ring member 162 from an inner periphery of the ring member 162 as shown in FIG. 5. The downward angle of the teeth 164 from the inner periphery of the ring member 162 may be in the range of about 0.5 degrees and about 70 degrees. Preferably, the angle is about 30 degrees. The teeth or prongs 164 may be configured to have different lengths and/or different shapes and configurations suitable to grip and hold a conduit 500 within the conduit receiving port 104.

Figure 8:
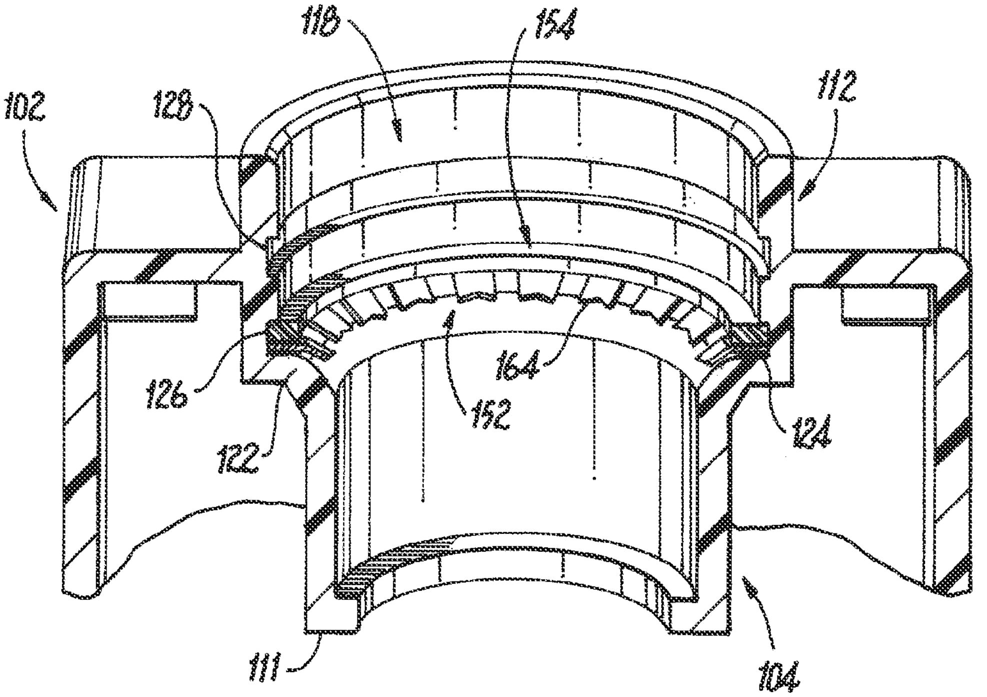
FIG. 8 is the enlarged cross-section view of the conduit receiving port of FIG. 7, illustrating a retaining member of the retention assembly positioned within the conduit receiving port and holding the conduit gripping member in position within the conduit receiving port.
Figure 9:
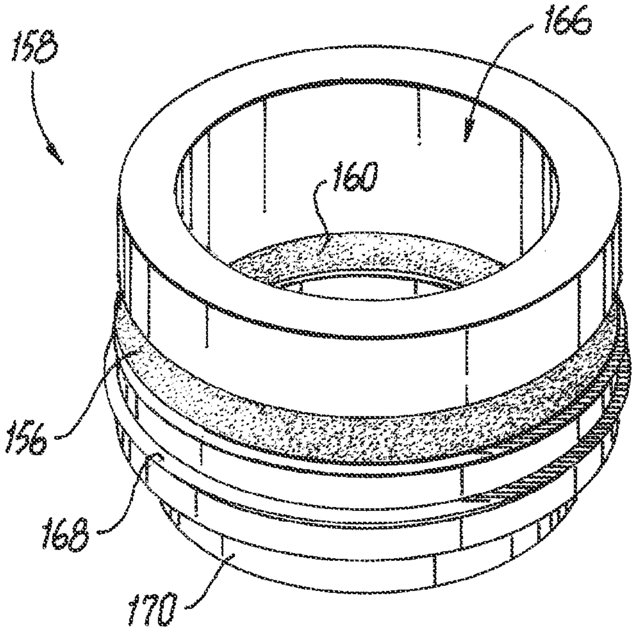
FIG. 9 is a perspective view of an exemplary embodiment of a release member of the retention assembly of FIG. 4, illustrating an inner seal member within an inner groove of the release member and an outer seal member within an outer groove of the release member.
Figure 10:
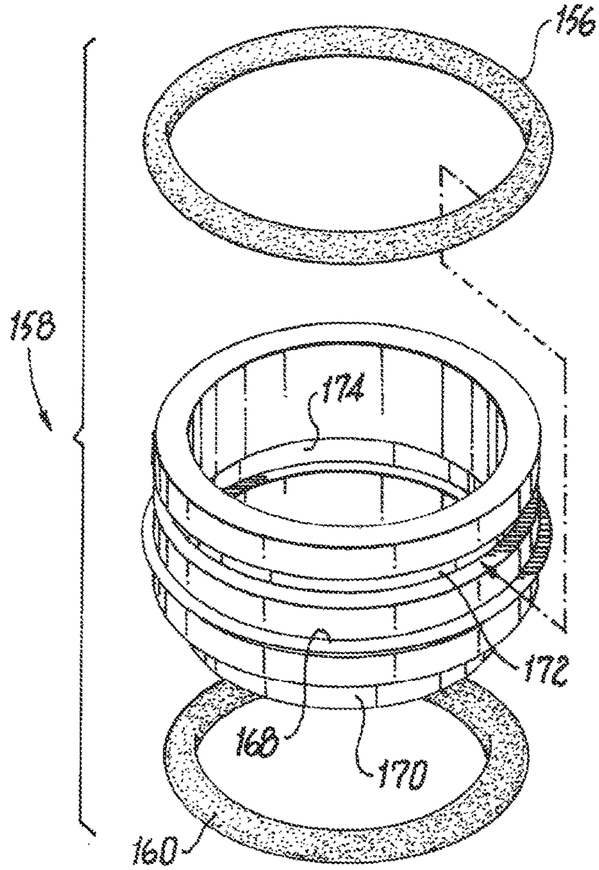
FIG. 10 is a top perspective view of the release member of FIG. 9, illustrating the inner seal member and the outer seal member separated from the release member.
Figure 11:
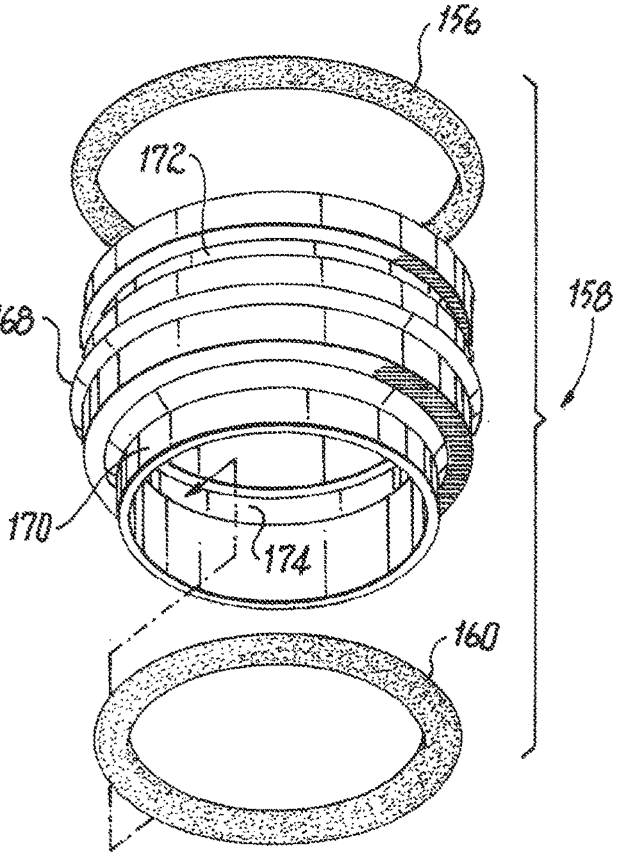
FIG. 11 is a bottom perspective view of the release member of FIG. 9, illustrating the inner seal member and the outer seal member separated from the release member.
Figure 16:
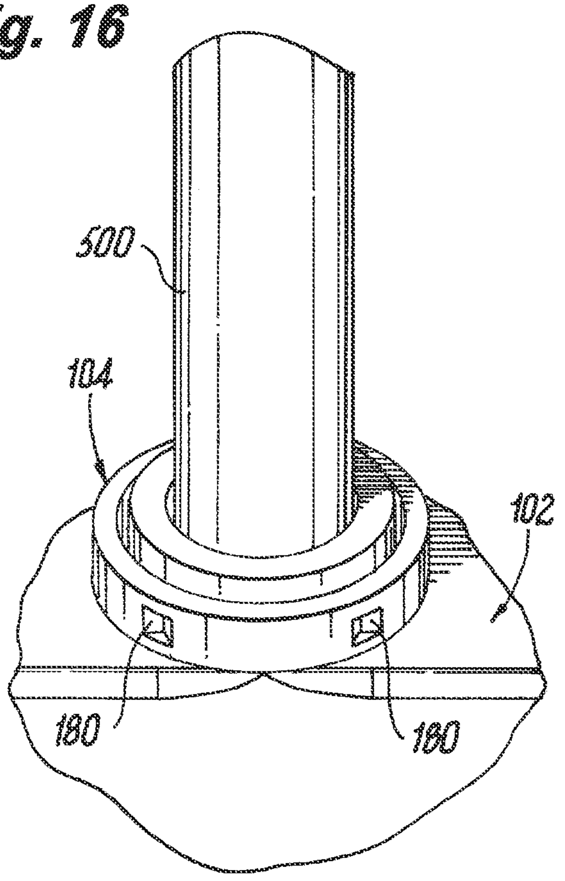
FIG. 16 is a rear perspective view of a portion of the electrical box and conduit of FIG. 15, illustrating indentions in a hub of the conduit receiving port for receiving tabs of a release tool.

Continuing to refer to FIGS. 4, 7 and 8, the retainer member 154 is a ring member having a hollow central portion. The retainer member 154 is configured and dimensioned to fit within the retainer member groove 126 in the interior of the circular wall 116 of the upper portion 112 of the conduit receiving port 104. Preferably, the retainer member 154 is a steel retainer ring that can flex to be fitted within the retainer member groove 126 in the interior of the circular wall 116 and snap back into its normal shape to sit in the retainer member groove 126 and hold the conduit gripping member 152 within the assembly receiving area 120 of the conduit receiving port 104.

Referring to FIGS. 9-14, the release member 158 is a circular member having a central opening 166. The opening 166 in the release member 158 has a diameter configured and dimensioned to permit desired conduits, e.g., conduits 500, to pass therethrough. The release member 158 is made of a rigid material sufficient to hold the outer seal member 156 and the inner seal member 160 and to flex the teeth of the conduit gripping member 152 when the release member 158 is moved from the gripping position to the release position. The release member 158 includes an annular rib 168 configured and dimensioned to fit within the release member groove 128 of the wall 116 so that the release member 158 to limit motion of the release member 158 within the assembly receiving area 120 of the conduit receiving port 104. More specifically, when the release member 158 is in the gripping position, seen in FIG. 13, one edge of the rib 168 contacts an upper edge of the release member groove 128 to prevent withdrawal of the release member 158 from the conduit receiving port 104. When the release member 158 is in the release position, seen in FIG. 14, another edge of the rib 168 contacts a lower edge of the release member groove 128 to prevent further movement of the release member 158 toward the chamber 114 of the lower portion 110 of the conduit receiving port 104. The release member 158 has a lower edge 170 that is configured and dimensioned to press the teeth 164 of the conduit gripping member 152 in a direction toward the chamber 114 of the lower portion 110 of the conduit receiving port 104 so that the teeth 164 flex away from a conduit within the conduit receiving port 104 freeing the conduit 500 for removal from the conduit receiving port 104, when the release member 158 is moved to the release position. It is noted that in the gripping position, seen in FIG. 13, the teeth 164 of the conduit gripping member 152 extend into the hollow central portion of the ring member 162. In the release position, seen in FIG. 14, the teeth 164 of the conduit gripping member 152 flex away from a conduit within the conduit receiving port 104 freeing the conduit 500 for removal from the conduit receiving port 104.

The release member 158 includes an outer seal member groove 172 and an inner seal member groove 174. The outer seal member groove 172 is configured and dimensioned to receive and hold the outer seal member 156. The inner seal member groove 174 is configured and dimensioned to receive and hold the inner seal member 160. The seal members 156 and 160, seen in FIGS. 4, 10 and 11, in the exemplary embodiment shown are circular members having a center opening therethrough. A non-limiting example of a seal member 156 and/or 160 that can be inserted into the respective seal member groove, 172 or 174 is an O-ring. The seal members 156 and 160 may be formed from any suitable material that is sufficiently flexible, structurally and environmentally durable and resilient. Non-limiting examples of a suitable material for the seal members 156 and 160 include silicone, rubber and latex. The outer seal member 156 has an outer diameter sized so that the outer seal member 156 creates a seal between the wall 116 of the upper portion 112 of the conduit receiving port 104 and the release member 158 minimizing and possibly preventing moisture from passing into the device opening 106 of the box housing 102. The inner seal member 160 has an inner diameter sized so that when the inner seal member 160 is in contact with a proper sized conduit 500 inserted into the opening 166 in the release member 158, a sealed fit is formed between the seal member 160 and the outer surface of the conduit 500 minimizing and possibly preventing moisture from passing into the device opening 106 of the box housing 102.

Figure 15:
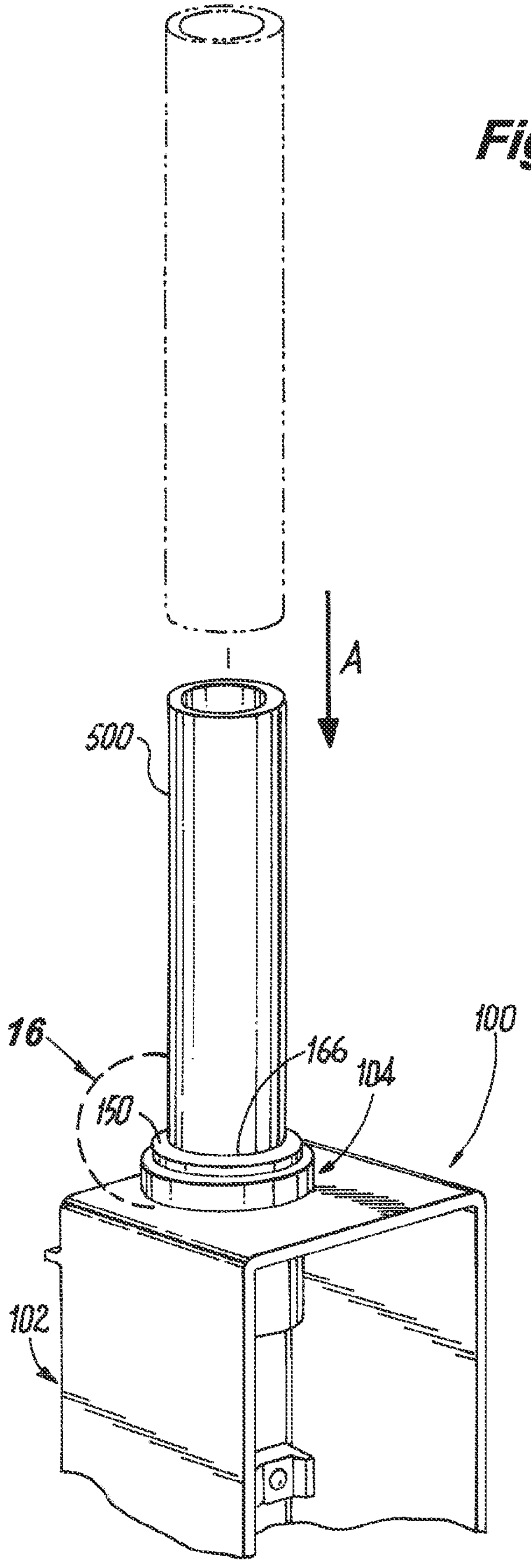
FIG. 15 is a perspective view of the electrical box of FIG. 1, illustrating insertion of an electrical conduit into the retention assembly positioned within the conduit receiving port of the electrical box.
Figure 36:
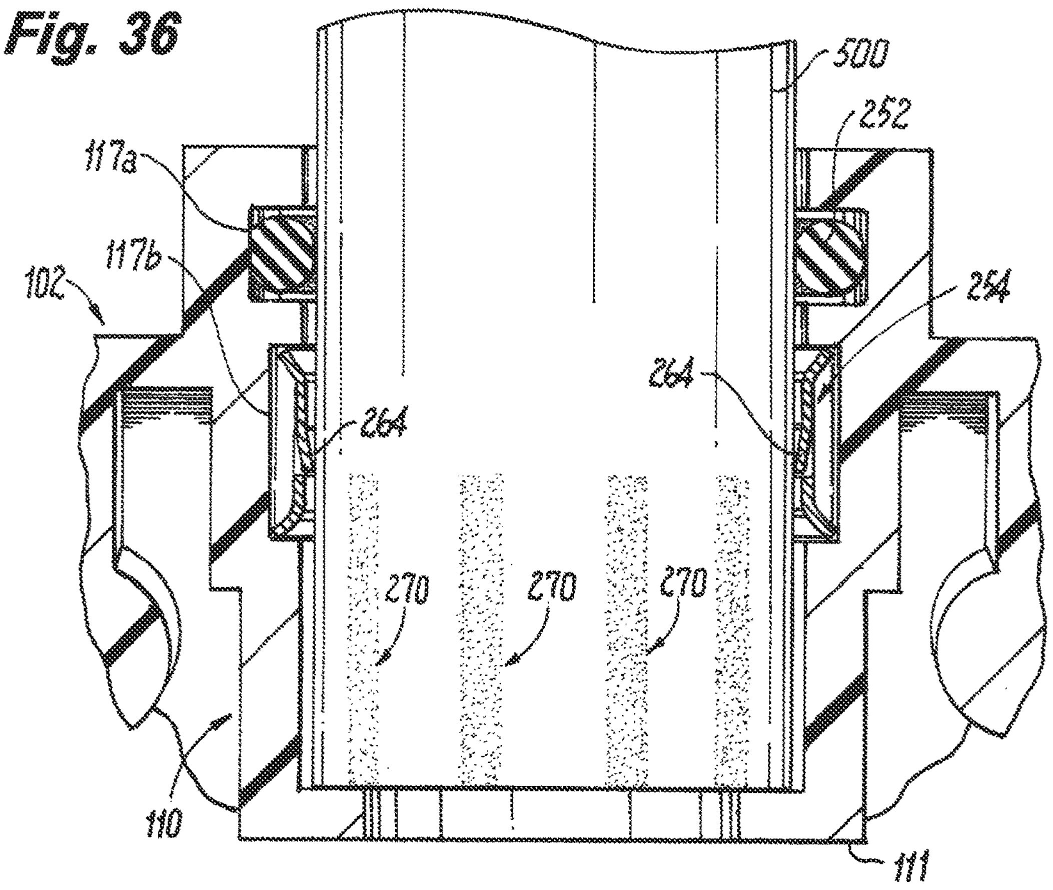
FIG. 36 is a cross-sectional view of the electrical box and conduit of FIG. 35 taken along line 36-36, illustrating the electrical conduit inserted into the retention assembly and held in positioned within the conduit receiving port by the conduit gripping member of the retention assembly and illustrating abrasion lines made to the electrical conduit by conduit grippers of the conduit gripping member.

Operation of the retention assembly 150 gripping and releasing a conduit 500 will now be described with reference to FIGS. 15-22. As shown in FIG. 15, to secure the conduit 500 to the box housing 102, the conduit 500 is positioned at the opening 166 of the release member 158, seen in FIG. 9, and pressed into the retention assembly 150 in the direction shown by arrow "A," seen in FIG. 15, with sufficient force to move the conduit 500 through the opening 166 in the release member 158 into the chamber 114 of the lower portion 110 of the conduit receiving port 104. As noted above, the lip or edge 111, seen in FIG. 12, in the lower portion 110 of the conduit receiving port 104 acts as a stop to prevent the conduit 500 from being pushed into the device opening 106 of the box housing 102. With the release member 158 in the gripping position, after the conduit 500 passes through the release member 158, the teeth 164 of the conduit gripping member 152 engage and grip the conduit 500 permitting forward advancement of the conduit into the chamber 114 of the lower portion 110 of the conduit receiving port 104 while preventing withdrawal of the conduit 500 from the retention assembly 150, thus securing the conduit 500 to the box housing 102. More specifically, in the exemplary embodiment shown, conduit gripping member 152 includes the ring member 162 and teeth 164 that face downward relative to the ring member 162 gripping the conduit 500 and preventing the conduit 500 from being removed or withdrawn from the conduit receiving port 104. It is noted that as the teeth 164 grip the conduit 500, the teeth 164 may flex as the conduit 500 is being passed through the opening 166 in the release member 158 and the conduit gripping member 152 into the chamber 114 in the lower portion 110 of the conduit receiving port 104. It is also noted that the teeth 164 of the conduit gripping member 152 may also create abrasion lines 270 on the exterior surface of the conduit 500, as seen in FIG. 36.

Figure 17:
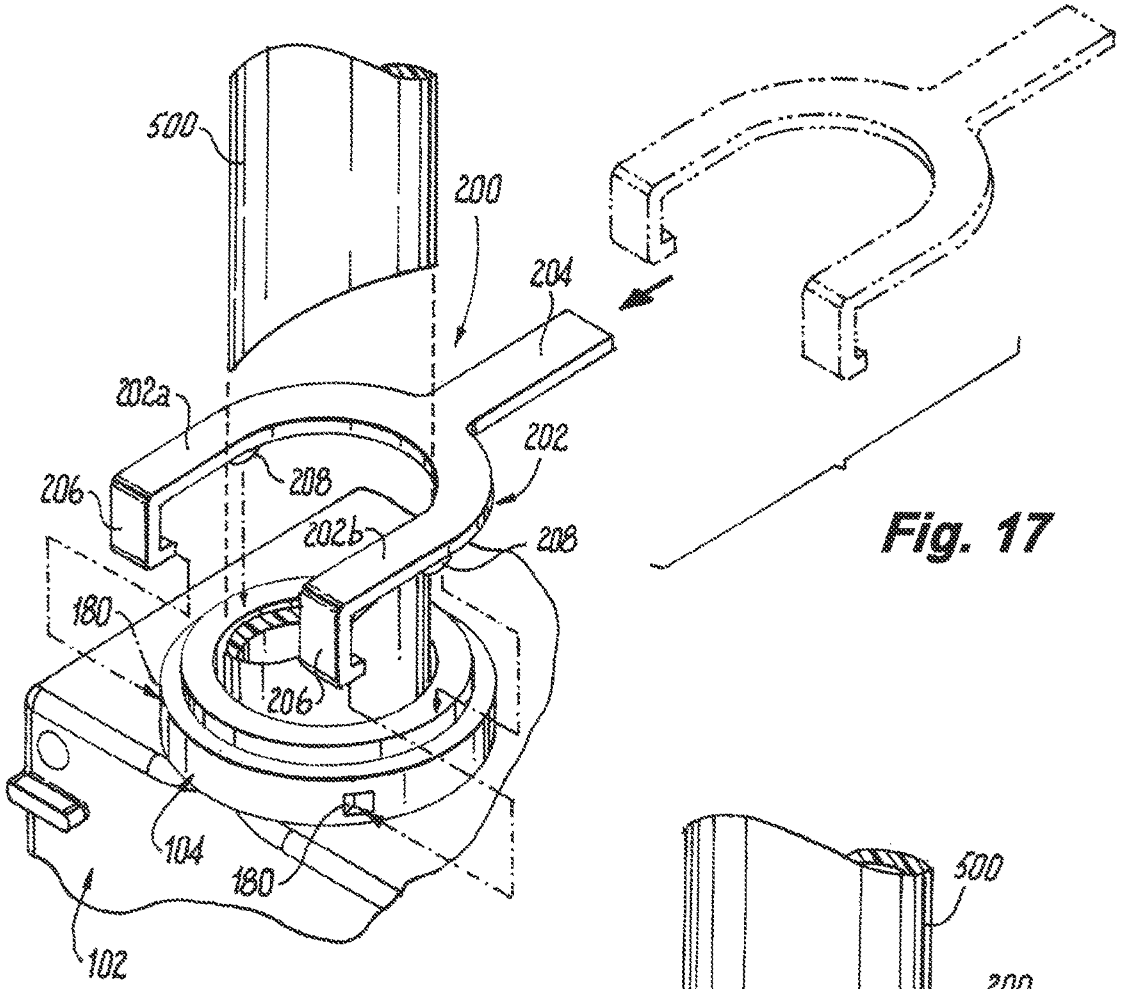
FIG. 17 is a top perspective view of the electrical box and conduit of FIG. 16, illustrating the tabs of the release tool positioned to engage the indentions in the hub of the conduit receiving port.
Figure 18:
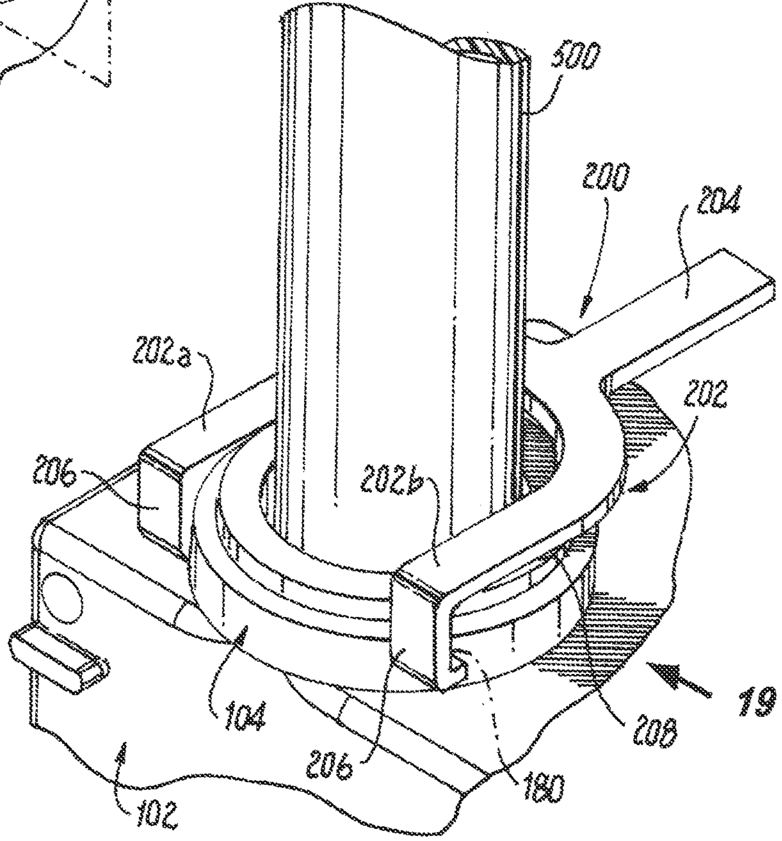
FIG. 18 is a top rear perspective view of the portion of the electrical box of FIG. 17, illustrating the tabs of the release tool engaged in the indentations in the hub of the conduit receiving port.
Figure 19:
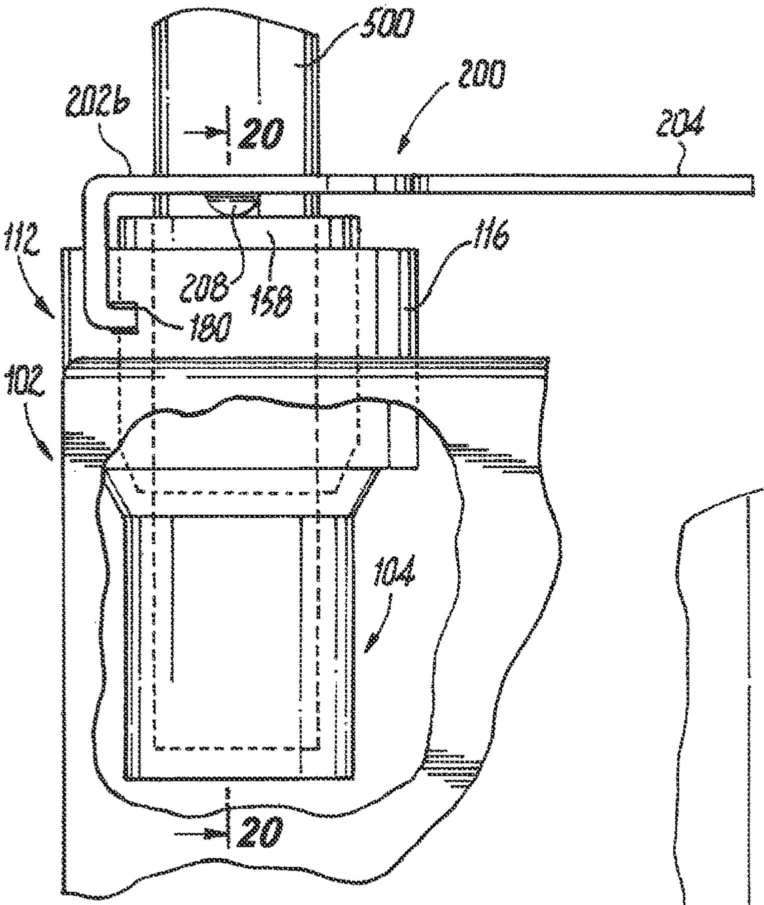
FIG. 19 is a side elevation view of the electrical box of FIG. 18, illustrating the tabs of the release tool engage in the indentations in the hub of the conduit receiving port of the electrical box.
Figure 20:
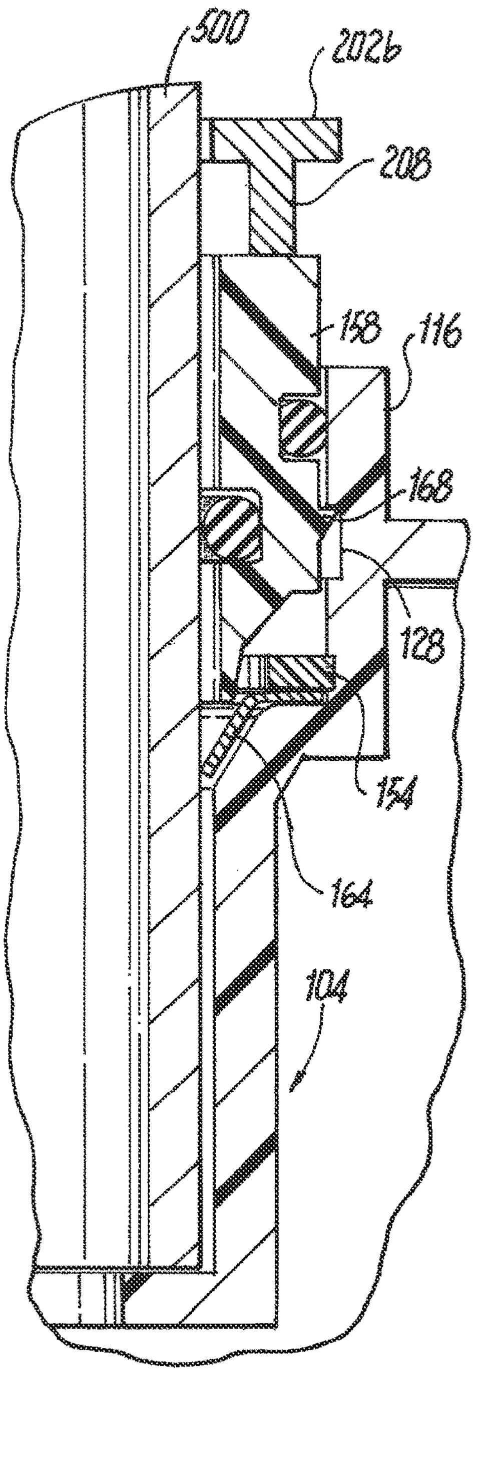
FIG. 20 is a cross-sectional view of the electrical box and release tool of FIG. 19 taken along line 20-20, illustrating the release member of the retention assembly in gripping position revealing teeth of the conduit gripping member used to grip the electrical conduit within the conduit receiving port of the electrical box.
Figure 21:
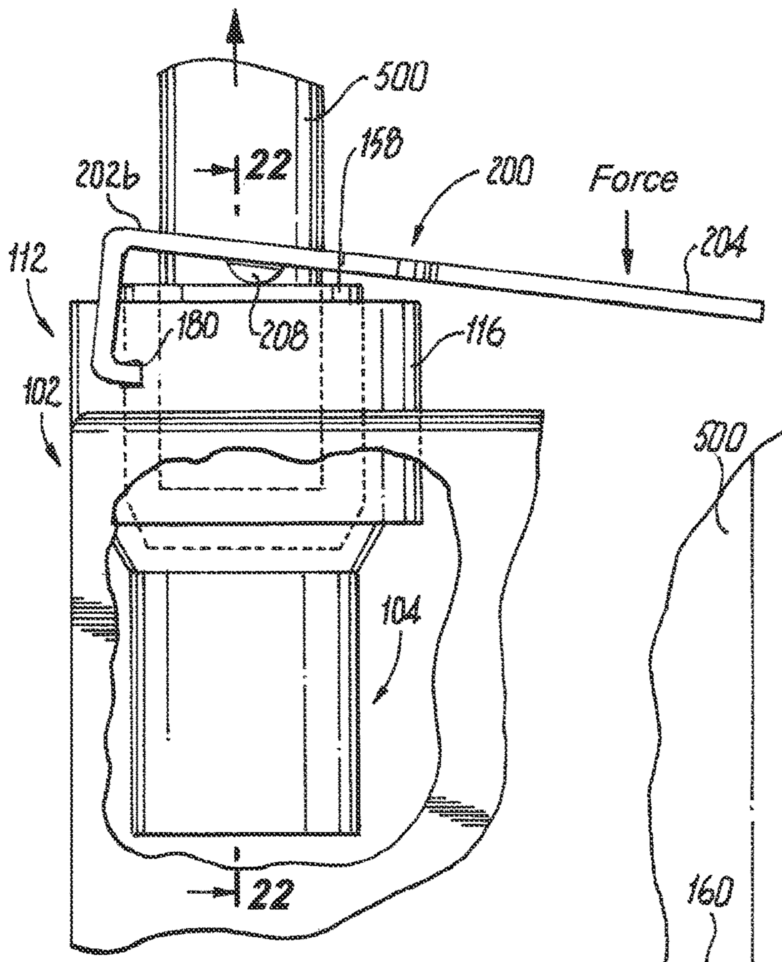
FIG. 21 is the side elevation view of the electrical box of FIG. 18, illustrating the release tool being pushed down to cause the release member to move in a direction toward the interior of the electrical box retention assembly to release the electrical conduit from the retention assembly.
Figure 22:
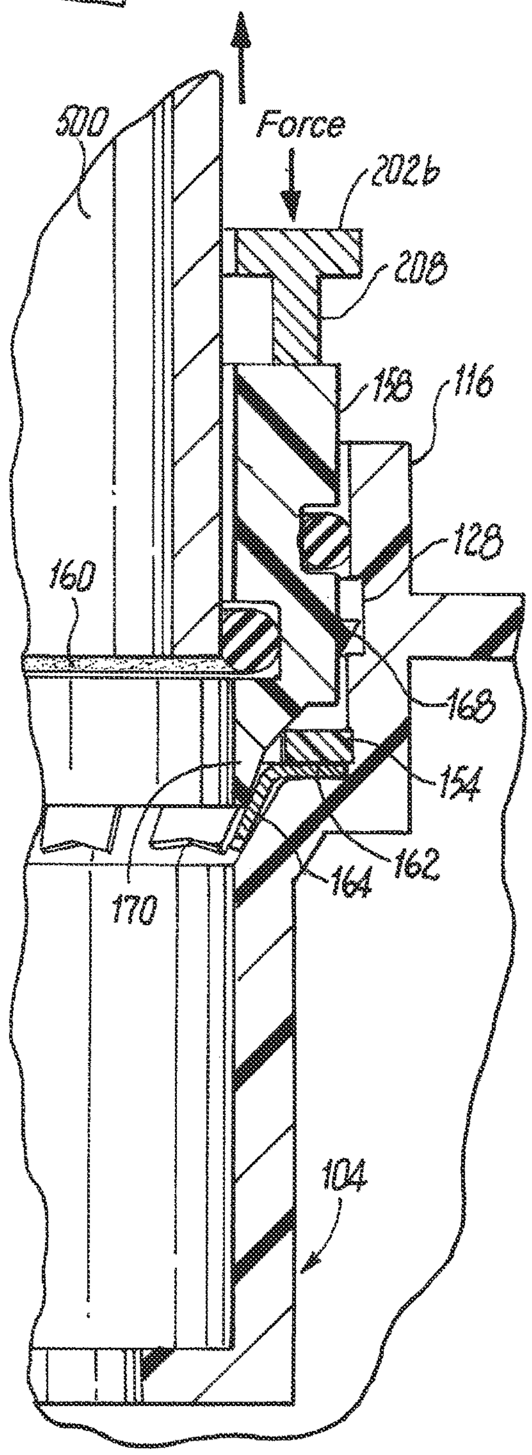
FIG. 22 is a cross-sectional view of the electrical box and retention assembly of FIG. 21 taken along line 22-22, illustrating the release member of the retention assembly in a release position that causes the teeth of the conduit gripping member to flex and release an electrical conduit within the conduit receiving port of the electrical box.

Referring now to FIGS. 17-22, to release the conduit 500 from the conduit receiving port 104, a release tool 200 is used. In this exemplary embodiment, the release tool 200 has a U-shaped main body 202 having two legs **202*a* and 202*b*, a lever arm 204 extending from the main body 202 and two L-shaped tabs 206. Each leg 202*a* and 202*b* has a pressure plate or pin 208 extending therefrom as shown in FIG. 17. The pressure plate or pin 208 is provided to contact the release member 158 and move the release member 158 when the release tool 200 is mated with the conduit receiving port 104 as described below. One tab 206 extends perpendicular to the leg 202*a* and the other tab 206 extends perpendicular to the leg 202*b*. The tabs 206 are configured to be received within indentations 180 in the wall 116 of the upper portion 112 of the conduit receiving port 104, as shown in FIGS. 16-19. With the tabs 206 of the release tool 200 in the indentations 180, the pressure plate or pin 208 extending from legs 202*a* and 202*b* of the main body 202 contact the release member 158, as seen in FIGS. 19 and 20. Pressure or force can then be applied to the lever arm 204 in a direction toward the electrical box 102, seen in FIG. 21, which moves the release member 158 from the gripping position, seen in FIG. 20, to the release position, seen in FIG. 22. As described above, with the release member 158 in the release position, the teeth 164 of the conduit gripping member 152 are flexed by the lower edge 170 of the release member 158 disengaging the teeth 164 from the conduit 500. With the release member 158 in the release position, the conduit 500 can be withdrawn from the retention assembly 150 within the conduit receiving port 104, as shown in FIG. 22**.

Referring now to FIGS. 23-34, the exemplary embodiment of a box 100 is shown with another exemplary embodiment of a retention assembly 150 according to the present disclosure in a conduit receiving port 104. The box 100 is substantially similar to the box 100 described in detail above so that a detailed description of the box 100 is not repeated here and like elements use the same reference numerals. In this embodiment, the interior of the one or more conduit receiving ports 104 have differences from the interior of the conduit receiving ports 104 described above and such difference are described below.

Figure 26:
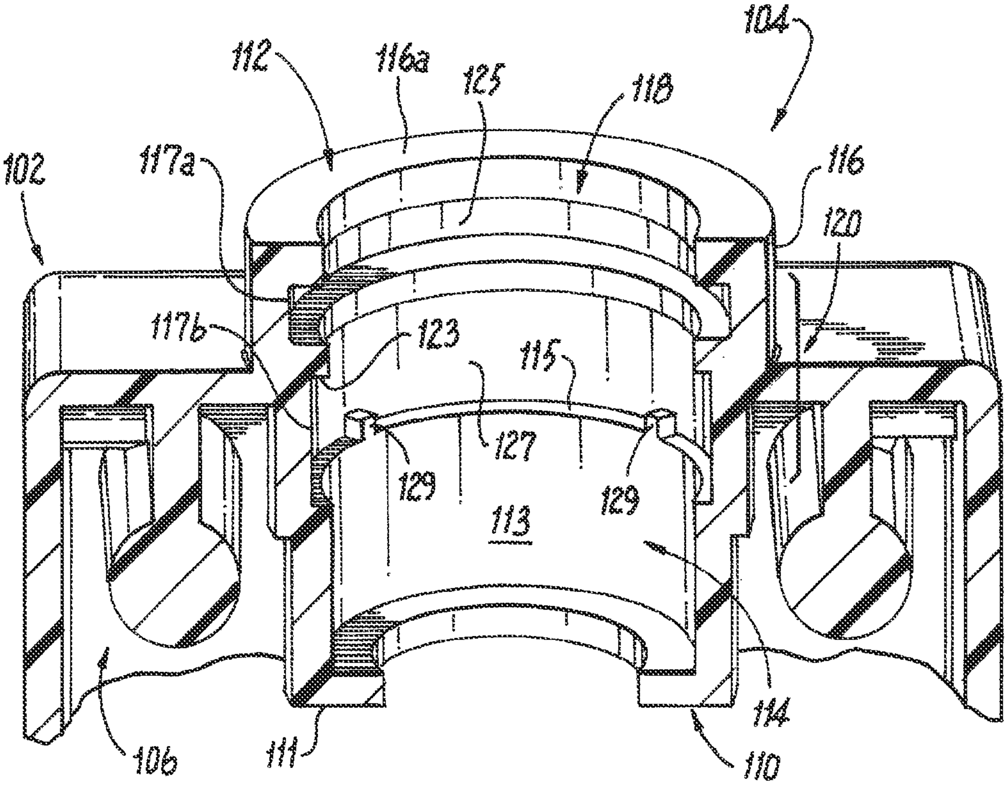
FIG. 26 is a cross-sectional view of the electrical box of FIG. 23 taken along line 26-26, illustrating the interior of the conduit receiving port of the electrical box.
Figure 27:
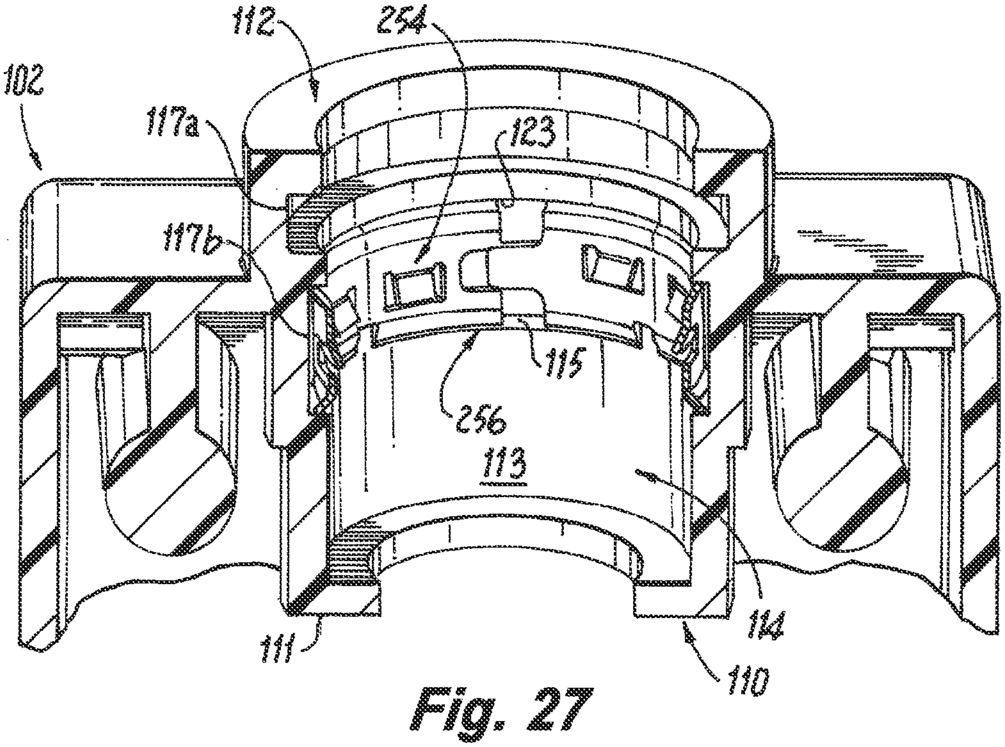
FIG. 27 is the cross-section view of the electrical box of FIG. 26, illustrating a conduit gripping member of the retention assembly positioned within the conduit receiving port.

Generally, the box 100 includes a housing 102 and one or more hubs or conduit receiving ports 104. The one or more conduit receiving ports 104 are preferably integral with or monolithically formed into the housing 102. In other embodiments, the one or more conduit receiving ports 104 may be secured to the housing 102 by, for example, welds or threaded connections. In the exemplary embodiment depicted in FIGS. 23-34, the box 100 includes a single conduit receiving port 104 on or extending from the top wall **102*a* of the housing 102. In this exemplary embodiment, each conduit receiving port 104 includes a lower portion 110 and an upper portion 112, seen in FIGS. 25-29. The lower portion 110 includes an inner wall 113 defining a chamber 114 configured and dimensioned to receive a conduit 500, seen in FIGS. 26-29, and an edge 111 forming a lip used as a stop to prevent the conduit 500 from being inserted into the device opening 106 of the box 100. In a non-limiting example, the chamber 114 has a circular in cross-section having an inner diameter "D1," seen in FIG. 25, in the range of, for example, about 0.688 inches and about 1.250 inches. The upper portion 112 of the conduit receiving port 104 includes a circular wall 116 with top lip 116*a* defining a conduit receiving opening 118 that extends to the chamber 114, seen in FIG. 27, of the lower portion 110. At least a portion of the upper portion 112 of the conduit receiving port 104 is configured, dimensioned and shaped to receive a retention assembly 250 according to this exemplary embodiment, seen in FIG. 24. The portion of the upper portion 112 configured, dimensioned and shaped to receive the retention assembly 250 may also be referred to herein as the assembly receiving area 120, seen in FIG. 26, of the conduit receiving port 104. The assembly receiving area 120 is in communication with the chamber 114 and the device opening 106, as shown in FIGS. 26 and 27**.

Referring to FIGS. 26-29, the assembly receiving area 120 includes an upper circular wall **117*a* and a lower circular wall 117*b*. Extending from the upper circular wall 117*a* is a lip 123 forming a ring within the conduit receiving opening 118. The upper circular wall 117*a* and lip 123 form a seal member channel or groove 125 within the conduit receiving opening 118. The seal member channel 125 of the assembly receiving area 120 is configured and dimensioned to hold a seal member of the retention assembly 250, seen in FIG. 28, described below. The lower circular wall 117***b* in the assembly receiving area 120 along with a ledge 115 of the wall 113 forming the chamber 114 and the lip 123 forms a gripping member channel or groove 127 that is configured and dimensioned to receive a conduit gripping member of the retention assembly 250, described below.

Figure 24:
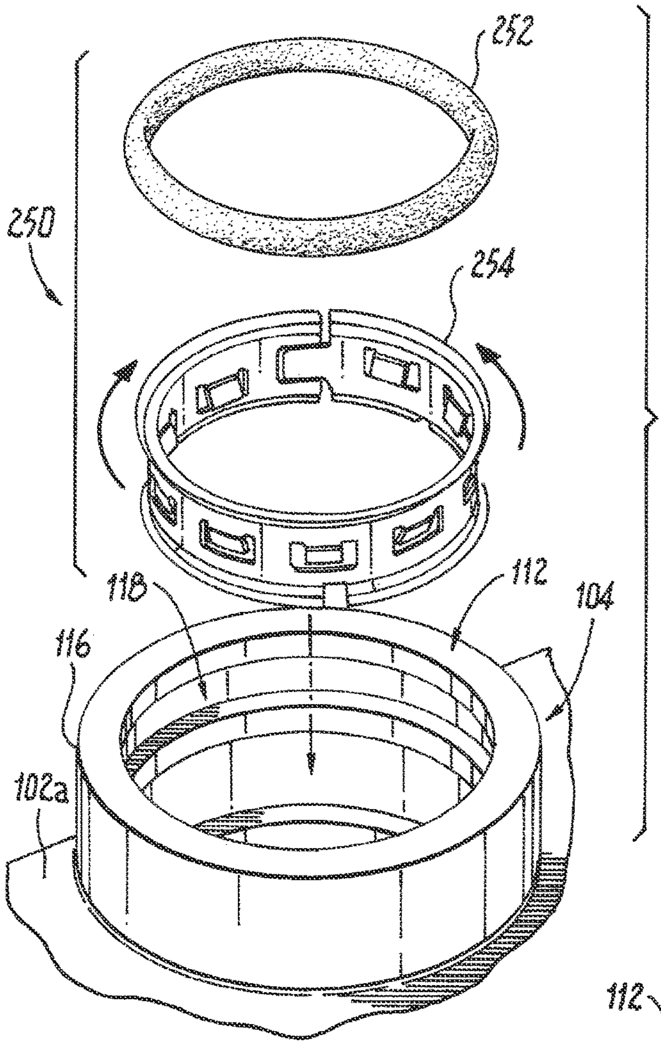
FIG. 24 is an exploded perspective view of the electrical box of FIG. 23, illustrating components of the retention assembly secured within the top conduit receiving port of the electrical box.
Figure 25:
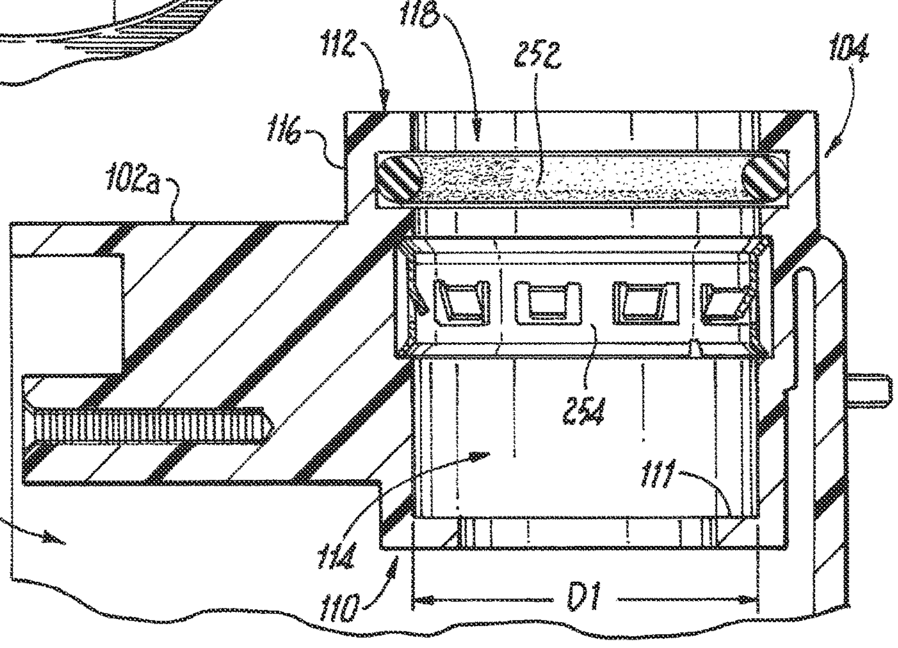
FIG. 25 is a cross-sectional view of a portion of the electrical box of FIG. 23 taken along line 25-25.

Referring to FIGS. 24, the components of the retention assembly 250 are shown removed from their particular spaces in the assembly receiving area 120 of the conduit receiving port 104. In the exemplary embodiment shown, the retention assembly 250 includes one or more seal members 252 and one or more conduit gripping members 254. The one or more seal members 252 provide a seal around a conduit, e.g., conduit 500, inserted through the conduit receiving opening 118 to limit and possibly prevent environmental conditions, e.g., water, from entering the device opening 106 of the box 100. The one or more conduit gripping members 254 are provided to hold or lock the conduit, e.g., conduit 500, within the conduit receiving port 104 as described below. In the embodiment shown the retention assembly 250 includes a single seal member 252 and a single conduit gripping member 254. The components of the retention assembly 250 is secured within the assembly receiving area 120 of the conduit receiving port 104 using, for example, a press fit, a friction fit, adhesives, mechanical fasteners and/or welds.

The retention assembly 250 may be configured and dimensioned to receive various outer diameter conduits. As a non-limiting example, the conduit 500 may be a ¾ inch conduit with an outer diameter "D3" of about 1.125 inches, or conduit 500 may be a ½ inch conduit with an outer diameter "D3" of about 0.875 inches, or the conduit 500 may be a 1 inch conduit with an outer diameter "D3" of about 1.375 inches. In such an example, the conduits may be PVC type conduits, EMT type conduits and/or Rigid type conduits. In other embodiments, the retention assembly 250 may be capable of receiving different conduit types of the same size. As non-limiting examples, the retention assembly 250 may be capable of receiving PVC type conduits, EMT type conduits and/or Rigid conduits of the same size, e.g., ½ inch. Similarly, the retention assembly 250 may be capable of receiving PVC type conduits, EMT type conduits and/or Rigid conduits of the same size, e.g., ¾ inch. In other embodiments, the retention assembly 250 may be capable of receiving the same conduit type of different sizes. As non-limiting examples, the retention assembly 250 may be capable of receiving PVC type conduits of different sizes, e.g., ½ inch, ¾ inch or 1 inch PVC conduit. Similarly, the retention assembly 250 may be capable of receiving EMT type conduits of the same size, e.g., ½ inch, ¾ inch or 1 inch EMT conduit. Similarly, the retention assembly 250 may be capable of receiving Rigid type conduits of the same size, e.g., ½ inch, ¾ inch or 1 inch Rigid conduit.

As noted above and as seen in FIGS. 28 and 29, each seal member 252 is configured and dimensioned to fit within the seal member channel 125 in the assembly receiving area 120 which holds the seal member 252 within the assembly receiving area 120 of the conduit receiving port 104. Each conduit gripping member 254 is configured and dimensioned to fit within the gripping member channel 127 in the assembly receiving area 120 which holds the conduit gripping member 254 within the assembly receiving area 120 of the conduit receiving port 104.

Figure 34:
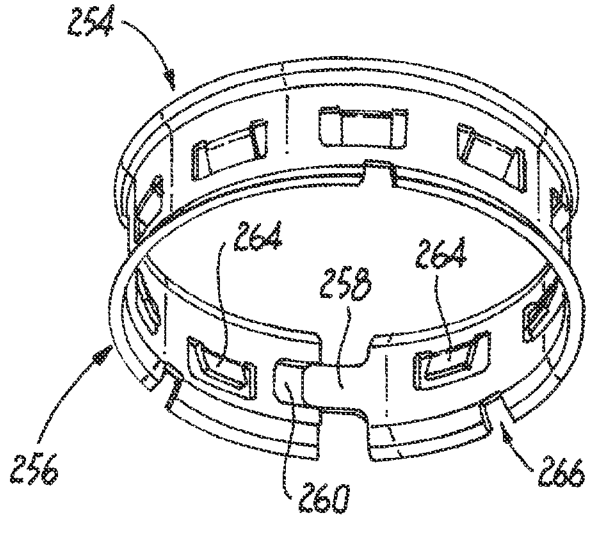
FIG. 34 is a bottom perspective view of the conduit gripping member of FIG. 32.

In the exemplary embodiment of FIGS. 30-34, each of the one or more conduit gripping members 254 starts out as a flat member 256 of a rigid material, such as steel. Preferably, each conduit gripping member 254 is formed from spring steel such as, for example, 1050 annealed spring steel that may be zinc plated. The flat member 256 has a first end 256*a* and a second end 256*b*. The first end 256*a* has a tab 258 extending therefrom, and the second end 256*b* has a notch 260 configured and dimensioned to at least partially receive the tab 258. The flat member 256 is then rolled into a ring member with a hollow central portion. The hollow central portion of the ring member 256 is configured and dimensioned to receive the desired diameter conduit, e.g., conduit 500. When the ring member 256 is formed, at least a portion of the tab 258 is within the notch 260 but there is a gap that permits the ring member 256 to expand or contract to accommodate conduits 500 with different outer diameters. As a result, the ring member 256 is a spring-like structure. In the exemplary embodiment shown in FIGS. 30-34, the ring member 256 includes one or more conduit grippers 264. In the embodiment of FIGS. 30-32, multiple conduit grippers 264 are shown. However, the present disclosure contemplates that a single conduit gripper 264 may be used. The single conduit gripper 264 may have a width that is wider that the conduit grippers shown in FIGS. 30-32. The width of the single conduit gripper 264 should be sufficient to engaging and holding conduits 500 within the conduit receiving port 104 when installed. In the exemplary embodiment shown, the one or more conduit grippers 264 are teeth or prongs extending from the ring member 256 toward the hollow central portion and angled relative to the ring member, as shown in FIG. 34. Preferably, the one or more teeth or prongs 264 are positioned around the ring member 256 and spaced apart. The spacing between the one or more teeth or prongs 264 is preferably in the range of about 0.125 inches and about 0.250 inches. The one or more teeth or prongs 264 are used for engaging and holding a conduit, e.g., conduit 500, within the conduit receiving port 104 when installed. As shown in FIG. 31, the length of each tooth 264 is configured so that each tooth 264 when spaced around the ring member 256 extends into the hollow central portion a distance "T" so that each tooth 264 can engage the desired outer diameter of the conduit 500 to grip the conduit and hold or lock the conduit, e.g., conduit 500, to prevent withdrawal of the conduit from the retention assembly 250. As a non-limiting example, to engage ½ inch PVC conduit, the distance "T" each tooth 264 extends into the hollow central portion may be in the range from about 0.050 inches to about 0.312 inches. As another non-limiting example, to engage ¾ inch Rigid conduit, the distance "T" each tooth 264 extends into the hollow central portion may be in the range from about 0.050 inches to about 0.312 inches. As another non-limiting example, to engage 1 inch EMT conduit, the distance "T" each tooth 264 extends into the hollow central portion may be in the range from about 0.050 inches to about 0.312 inches. A free end of each tooth or prong 264 may have a flat end or tip, a single pointed end or tip or a multi-pointed end or tip. In the exemplary embodiment shown, the free end of each tooth or prong 264 is a flat end or tip. As noted, the teeth or prongs 264 extend inwardly toward the hollow central portion of the ring member 256 and downwardly or at an angle "a" relative to the ring member 256 from an inner periphery of the ring member 256 as shown in FIG. 31. The angle "a" of the teeth 264 from the inner periphery of the ring member 256 may be in the range of about 0.5 degrees and about 70 degrees. Preferably, the angle "a" is about 30 degrees. The teeth or prongs 264 may be configured to have different lengths and/or different shapes and configurations suitable to grip and hold a conduit, e.g., conduit 500, within the conduit receiving port 104.

Figure 28:
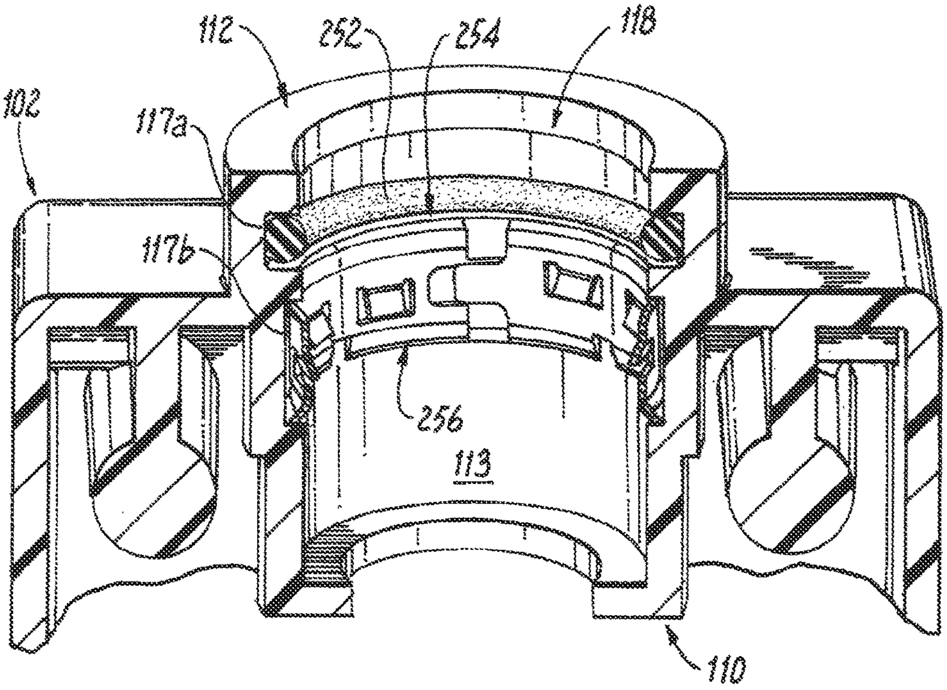
FIG. 28 is the cross-section view of the electrical box of FIG. 27, illustrating a seal member of the retention assembly positioned within the conduit receiving port above the conduit gripping member positioned within the conduit receiving port.
Figure 29:
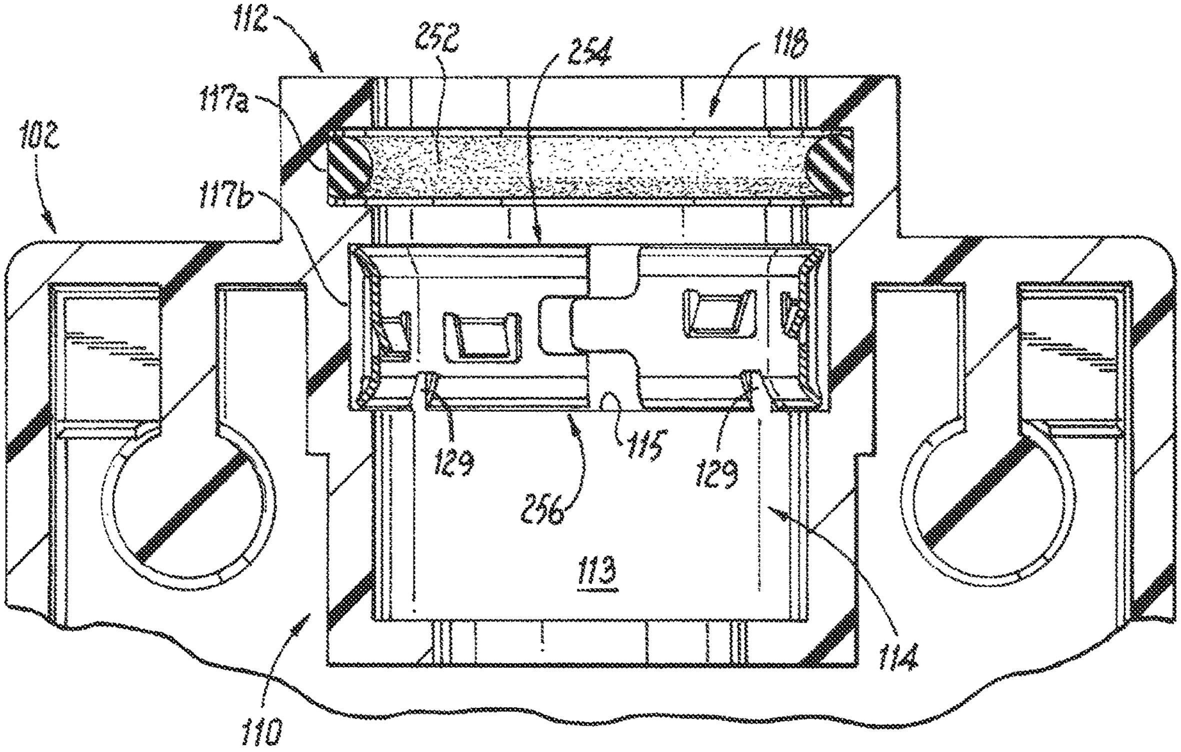
FIG. 29 is a side elevation view of the conduit receiving port of FIG. 28, illustrating the seal member of the retention assembly positioned within the conduit receiving port above the conduit gripping member positioned within the conduit receiving port.
Figure 33:
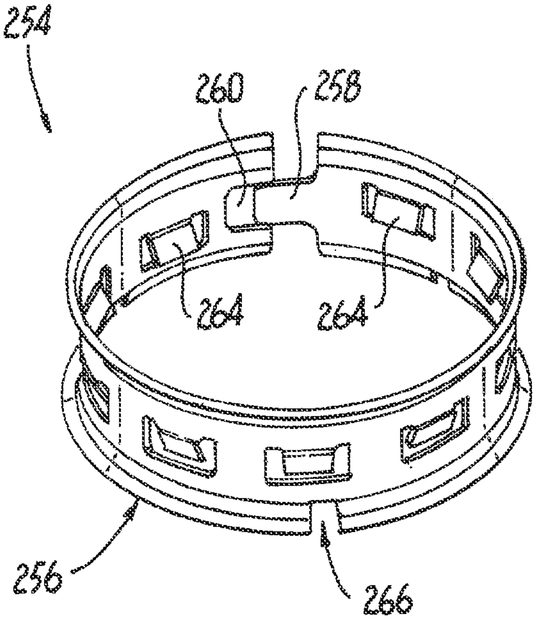
FIG. 33 is a top perspective view of the conduit gripping member of FIG. 32.

Continuing to refer to FIGS. 30-34, at least one edge 256*c* of the ring member 256 has one or more notches 266 configured and dimensioned to receive tabs 129 extending from the ledge 115 of the wall 113 forming the chamber 114 as shown in FIGS. 28 and 29. The tabs 129 and notches 266 align the ring member 256 within the gripping member channel 127 and prevent the ring member 256 from rotating when a conduit 500 is being inserted into the conduit receiving opening 118.

Figure 35:
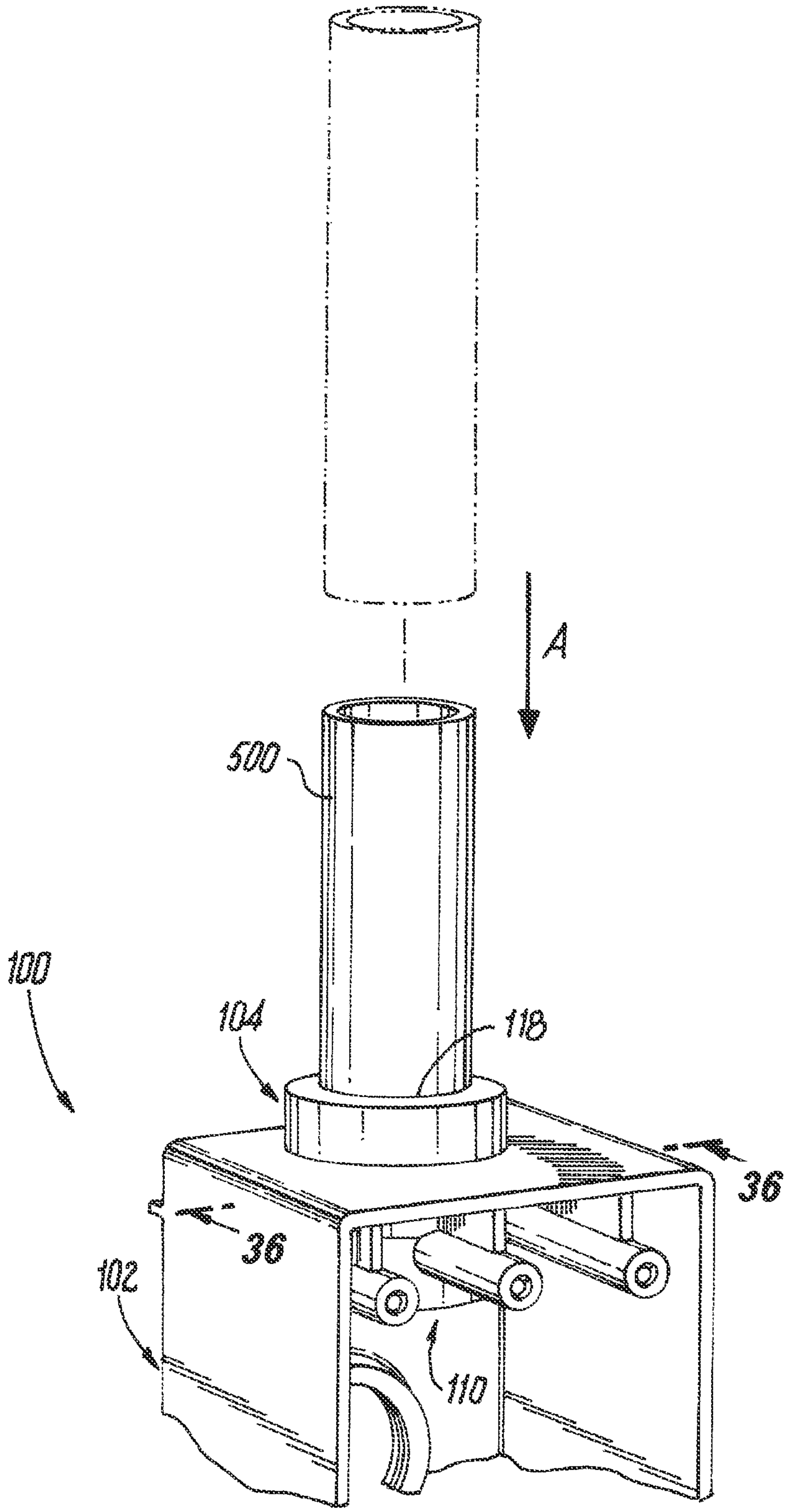
FIG. 35 is a perspective view of the electrical box of FIG. 23, illustrating an electrical conduit being inserted into the retention assembly positioned within the conduit receiving port of the electrical box.

Operation of the retention assembly 250 gripping and releasing a conduit 500 will now be described with reference to FIGS. 35-37. As shown, to secure the conduit 500 to the box housing 102, the conduit 500 is positioned at the conduit receiving opening 118 of the conduit receiving port 104 and pressed into the conduit receiving opening 118 in the direction shown by arrow "A," seen in FIG. 35, with sufficient force to move the conduit 500 through the assembly receiving area 120 and through the retention assembly 250 into the chamber 114 of the lower portion 110 of the conduit receiving port 104. As noted above, the lip 111 in the lower portion 110 of the conduit receiving port 104 acts as a stop to prevent the conduit 500 from being pushed into the device opening 106 of the box housing 102. When the conduit 500 passes into and through the retention assembly 250, the teeth 264 of the conduit gripping member 254 engage and grip the conduit 500 permitting forward advancement of the conduit 500 into the chamber 114 of the lower portion 110 of the conduit receiving port 104 while preventing withdrawal of the conduit 500 from the retention assembly 250, thus securing the conduit 500 to the box housing 102. More specifically, in the exemplary embodiment shown, conduit gripping member 254 includes the ring member 256 and teeth 264 that face downward relative to the ring member 256 gripping the conduit 500 and preventing the conduit 500 from being removed or withdrawn from the conduit receiving port 104. It is noted that as the teeth 264 grip the conduit 500, the teeth 264 may flex as the conduit 500 is being passed through the conduit receiving opening 118 and the conduit gripping member 254 into the chamber 114 in the lower portion 110 of the conduit receiving port 104. It is also noted that the teeth 264 of the conduit gripping member 254 may also create abrasion lines 270 on the exterior surface of the conduit 500, as seen in FIG. 36.

Figure 37:
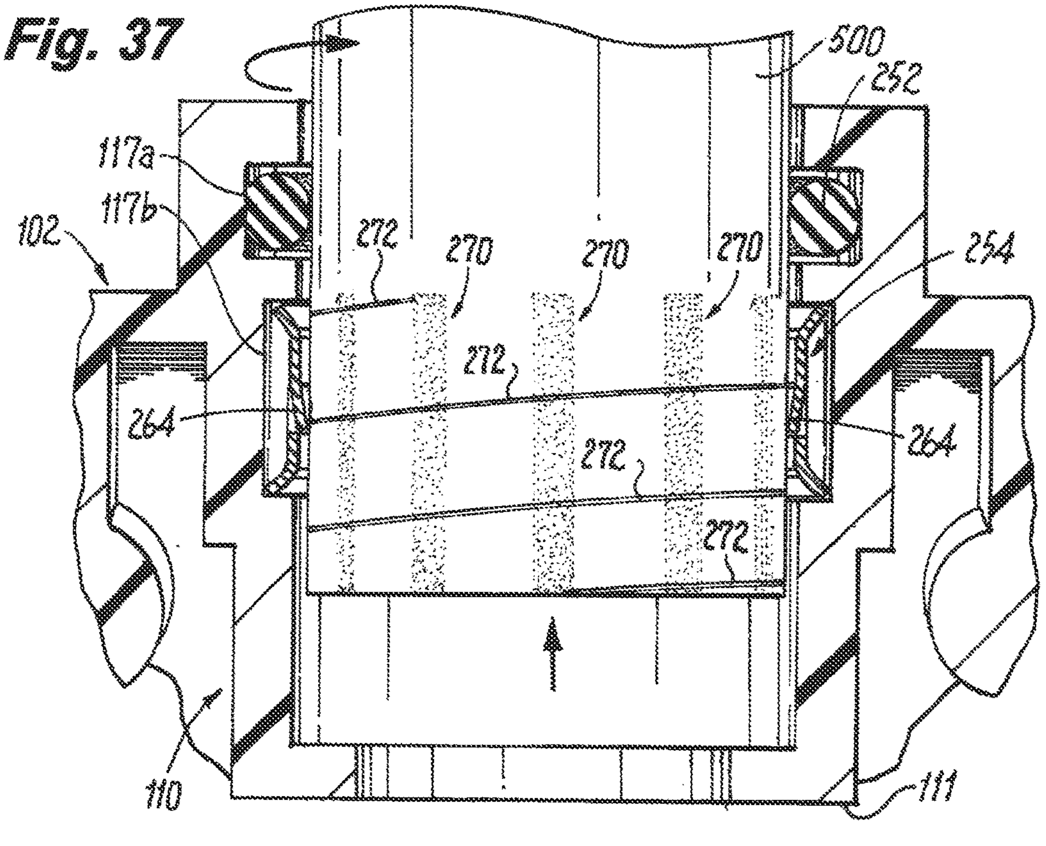
FIG. 37 is a cross-sectional view of the electrical box and conduit similar to FIG. 36, illustrating the electrical conduit gripped by the retention assembly and the electrical conduit being rotated and pulled in a direction out of the conduit receiving port, and illustrating a score line made to the electrical conduit by the teeth of the conduit gripping member of the retention assembly.

To release the conduit 500 from the conduit receiving port 104, the electrician or other technician rotates the conduit 500 while pulling the conduit out of the conduit receiving port 104, as shown in FIG. 37. The electrician or other technician can rotate the conduit 500 either counter-clockwise or clockwise while pulling on the conduit 500 so as to remove the conduit 500 from the conduit receiving port 104. As the conduit 500 is rotated and pulled, the teeth 264 may create a cut line 272 the exterior surface of the conduit 500, as seen in FIG. 37. In another embodiment, the electrician or other technician can rotate the box 100 while pulling the box 100 away from the conduit 500. The electrician or other technician can rotate the box 100 either counter-clockwise or clockwise while pulling on the box 100 so as to remove the conduit 500 from the conduit receiving port 104.

One or more of the exemplary embodiments of the present disclosure describe a weatherproof box with hubs or so called conduit receiving ports that have a push-to-connect style fitting built directly into the hubs. For an installation process using such devices, the user will simply push in the conduit, such as PVC, EMT or Rigid conduit, into the hub and a metal conduit gripping member, e.g., a steel spring clip, will bite into the conduit locking it into the hub. According to the exemplary embodiments of the present disclosure, one or more members forming an integral conduit release member are built into the hubs. According to various embodiments, an O-ring or other gaskets may be incorporated in the hub to minimize and possibly prevent moisture from getting into the interior of the box. In alternative embodiments, multiple options are provided that make available different weatherproof box configurations, each having a different hub quantity and/or hub location around the box, wherein the hub concept or construction can be selected from the examples described herein. In certain embodiments, a portion of the topmost piece of the hub or another internal component of the fitting may be threaded to accept a closure plug when the hub is not in use. These new methods, configurations and fittings reduce the need for a traditional separate conduit fitting and will drastically reduce the labor required to install the conduit to the box and allows easy removal of conduits from the hub without requiring any additional tools.

In certain embodiments, the box housing is constructed of steel or cast aluminum. In yet other embodiments, one of many different plastics (PVC, PC) that are traditionally used may be selected or any other traditionally used material for electrical boxes, including weatherproof electrical boxes. Weatherproof seal members, such as O-rings or other gaskets, are constructed of Ethylene Propylene diene Monomer (EPDM), another rubber, silicon or any other suitable material for providing an appropriate seal. The alternative mechanisms described herein may share certain features and/or capabilities, but the manufacturing assembly process may vary.

While illustrative embodiments of the present disclosure have been described and illustrated above, it should be understood that these are exemplary and are not to be considered as limiting. Additions, deletions, substitutions, and other modifications can be made without departing from the spirit or scope of the present disclosure. Accordingly, the present disclosure is not to be considered as limited by the foregoing description.

What is claimed is:

1. An electrical box comprising:

at least one conduit receiving port having an inner surface and a conduit receiving opening; and at least one conduit retention assembly positioned in the conduit receiving opening, the at least one conduit retention assembly including:

at least one seal member; and at least one conduit gripping member, the at least one conduit gripping member including a spring-like ring member having a hollow central portion and a plurality of conduit grippers spaced apart around a perimeter of the ring member, each of the plurality of conduit grippers extending into the hollow central portion a predefined distance, the ring member having a first end adjacent a second end such that a gap is between the first end and the second end, the gap permitting the ring member to expand and contract to receive conduits with different outer diameters.

2. The electrical box according to claim 1, wherein the plurality of conduit grippers comprise teeth extending from the ring member into the hollow central portion.

3. The electrical box according to claim 1, wherein the predefined distance is in the range of between about 0.050 inches and about 0.312 inches.

4. The electrical box according to claim 1, wherein each of the plurality of conduit grippers extend at an angle relative to the ring member.

5. The electrical box according to claim 1, wherein the at least one seal member comprises an O-ring.

6. An electrical box comprising:

at least one conduit receiving port having an inner surface and a conduit receiving opening; and at least one conduit retention assembly secured within the conduit receiving opening, the at least one conduit retention assembly including:

a seal member; and a conduit gripping member, the conduit gripping member including a spring-like ring member having a hollow central portion and a plurality of conduit grippers spaced apart around a perimeter of the ring member, each of the plurality of conduit grippers extending into the hollow central portion a predefined distance, the ring member having a first end adjacent a second end such that a gap is between the first end and the second end, the gap permitting the ring member to expand and contract to receive conduits with different outer diameters.

7. The electrical box according to claim 6, wherein the plurality of conduit grippers comprise teeth extending from the ring member into the hollow central portion.

8. The electrical box according to claim 6, wherein the predefined distance is in the range of between about 0.050 inches and about 0.312 inches.

9. The electrical box according to claim 6, wherein each of the plurality of conduit grippers extend at an angle relative to the ring member.

10. The electrical box according to claim 6, wherein the seal member comprises an O-ring.

11. A conduit retention assembly comprising:

a seal member;

a conduit gripping member including a spring-like ring member having a hollow central portion and a plurality of conduit grippers spaced apart around a perimeter of the ring member, each of the plurality of conduit grippers extending into the hollow central portion a predefined distance, the ring member having a first end adjacent a second end such that a gap is between the first end and the second end, the gap permitting the ring member to expand and contract to receive conduits with different outer diameters.

12. The conduit retention assembly according to claim 11, wherein the plurality of conduit grippers comprise teeth extending from the ring member into the hollow central portion.

13. The conduit retention assembly according to claim 11, wherein the predefined distance is in the range of between about 0.050 inches and about 0.312 inches.

14. The conduit retention assembly according to claim 11, wherein each of the plurality of conduit grippers extend at an angle relative to the ring member.

15. The conduit retention assembly according to claim 11, wherein the seal member comprises an O-ring.

16. An electrical box comprising:

at least one conduit receiving port having an inner surface and a retention assembly opening; and at least one conduit retention assembly secured positioned in the retention assembly opening, the at least one conduit retention assembly including:

at least one conduit gripping member having one or more conduit grippers;

a retainer member positioned adjacent the at least one conduit gripping member; and a conduit release member operatively coupled to the at least one conduit receiving port and movable within the retention assembly opening relative to the at least one conduit receiving port between a gripping position and a release position, such that when moved to the release position a lower edge of the release member presses the one or more conduit grippers so that the one or more conduit grippers flex to free a conduit within the at least one conduit receiving port for removal from the at least one conduit receiving port.

17. The electrical box according to claim 16, wherein the at least one conduit gripping member includes a ring having a hollow central portion, and the one or more conduit grippers a plurality of teeth extending from the ring toward the hollow central portion.

18. The electrical box according to claim 16, wherein the plurality of the one or more conduit grippers comprise teeth have a predefined length in the range of between about 0.050 inches and about 0.312 inches.

19. The electrical box according to claim 18, wherein the plurality of the one or more teeth extend at an angle relative to the ring.

20. An electrical box comprising:

at least one conduit receiving port having an inner surface and a retention assembly opening; and at least one conduit retention assembly secured within the retention assembly opening, the at least one conduit retention assembly including:

at least one conduit gripping member that includes a ring having a hollow central portion and a plurality of teeth extending from the ring toward the hollow central portion;

a retainer member positioned adjacent the at least one conduit gripping member; and a conduit release member operatively coupled to the at least one conduit receiving port and movable relative to the at least one conduit receiving port between a gripping position and a release position.

21. The electrical box according to claim 20, wherein the plurality of teeth have a predefined length in the range of between about 0.050 inches and about 0.312 inches.

22. The electrical box according to claim 20, wherein the plurality of teeth extend at an angle relative to the ring.

23. A conduit retention assembly adapted to be secured within a retention assembly opening in a conduit receiving port of an electrical box, the conduit retention assembly comprising:

at least one conduit gripping member includes a ring having a hollow central portion and a plurality of teeth extending from the ring toward the hollow central portion such that each of the plurality of teeth are at an angle relative to the ring;

a retainer member positioned adjacent the at least one conduit gripping member; and a conduit release member movable relative to the at least one conduit gripping member between a gripping position and a release position.

24. The conduit retention assembly electrical box according to claim 23, wherein the plurality of teeth have a predefined length in the range of between about 0.050 inches and about 0.312 inches.

25. The conduit retention assembly electrical box according to claim 23, wherein the plurality of teeth extend at an angle relative to the ring.

* * * * *